United States Patent [19]
Yamanaka et al.

[11] Patent Number: 5,983,247
[45] Date of Patent: Nov. 9, 1999

[54] DATA CONVERSION APPARATUS FOR READING A DOCUMENT FOR A DISPLAY SCREEN AND GENERATING A DISPLAY IMAGE FOR ANOTHER DISPLAY SCREEN WHICH HAS A DIFFERENT ASPECT RATIO FROM THE FORMER DISPLAY SCREEN

[75] Inventors: Kiyokazu Yamanaka, Ashiya; Kazuo Okamura, Hirakata; Junichi Hirai, Suita; Hidekazu Tanigawa, Hirakata; Chihiro Kawahara, Moriguchi, all of Japan

[73] Assignee: Matsushita Electric Industrial Co., Ltd., Osaka, Japan

[21] Appl. No.: 08/865,087

[22] Filed: May 29, 1997

[30] Foreign Application Priority Data

May 30, 1996 [JP] Japan ................................. 8-137102

[51] Int. Cl.$^6$ .................................................. G06F 17/21
[52] U.S. Cl. ......................................... 707/526; 707/513
[58] Field of Search .................................. 345/507, 1, 2, 345/3, 118, 127, 128, 129, 132; 707/513, 526

[56] References Cited

U.S. PATENT DOCUMENTS

| | | | |
|---|---|---|---|
| 4,580,242 | 4/1986 | Suzui et al. | 395/112 |
| 5,513,342 | 4/1996 | Leong et al. | 345/340 |
| 5,555,380 | 9/1996 | Suzuki . | |
| 5,557,728 | 9/1996 | Garrett et al. . | |
| 5,600,844 | 2/1997 | Shaw et al. | 345/507 |
| 5,689,585 | 11/1997 | Bloomberg et al. | 382/229 |

FOREIGN PATENT DOCUMENTS

| | | |
|---|---|---|
| 723369 | 7/1996 | European Pat. Off. . |
| 99160 | 1/1997 | Japan . |
| 997265 | 4/1997 | Japan . |

OTHER PUBLICATIONS

"Consumer Electronics," T.S. Perry, IEEE Spectrum, vol. 34, No. 1, Jan. 1997, pp. 43–48.

Primary Examiner—James P. Trammell
Assistant Examiner—John Leonard Young
Attorney, Agent, or Firm—Price, Gess & Ubell

[57] ABSTRACT

A data conversion apparatus is provided for reading a document for a display screen and generating a display image for another display screen which has a different aspect ratio from the former display screen, where the document is composed of control statements written along with character strings or image information. The data conversion apparatus obtains the document from an external unit and converts the character strings and the image information in the document into display image elements based on conversion information. The data conversion apparatus judges whether a storage includes a blank for storing the display image elements at an appropriate position based on the conversion information. The data conversion apparatus writes the display image elements into the blank if it judges that the storing unit includes the blank; the data conversion apparatus assigns a new storage area in the storage and writes the display image elements into the new storage area if it judges that the storing unit does not include the blank.

17 Claims, 35 Drawing Sheets

FIG. 2

FILE LIST 200

| SERIAL NO. | ADDRESS | FILE NAME |
|---|---|---|
| 0001 | http://www.wbc.com/main | Report.html<br>Weather.gif<br>Weather.au |
| 0002 | http://www.wbc.com/sub1 | Tokyo.html |
| 0003 | http://www.wbc.com/sub1 | Osaka.html |
| ... | ... | ... |

FIG. 3

HTML DOCUMENT
301

311 ⟨HTML⟩

312 ⟨H1⟩ WEATHER REPORT ⟨/H1⟩

313 ⟨CENTER⟩

314 ⟨IMG SRC="Weather.gif"⟩

315 ⟨/CENTER⟩

316 ⟨P⟩ TOMORROW,THE WHOLE OF JAPAN WILL ENJOY

317 SPRINGLIKE WEATHER ⟨/P⟩

318 ⟨UL⟩

319 ⟨LI⟩  ⟨A HREF="Tokyo.html"⟩ TOKYO ⟨/A⟩

320 ⟨LI⟩  ⟨A HREF="Osaka.html"⟩ OSAKA ⟨/A⟩

321 ⟨LI⟩  ⟨A HREF="Weather.au"⟩ AUDIO INFORMATION ⟨/A⟩

322 ⟨/UL⟩

323 ⟨/HTML⟩

Report.html

401 IMAGE INFORMATION

Weather. gif

HTML DOCUMENT 501

```
<HTML>
<H1> TOKYO WEATHER </H1>
<UL>
<LI> TOMORROW—FINE
<LI> DAY AFTER TOMORROW—FINE
</UL>
<LI>  <A HREF="Report.html"> RETURN </A>
</HTML>
```

511

Tokyo.html

FIG. 6

HTML DOCUMENT 601

```
〈HTML〉
〈H1〉 OSAKA WEATHER 〈/H1〉
〈UL〉
〈LI〉 TOMORROW-FINE
〈LI〉 DAY AFTER TOMORROW-FINE
〈/UL〉
〈LI〉  〈A HREF="Report.html"〉 RETURN 〈/A〉
〈/HTML〉
```

611

Osaka.html

FIG. 7

LINK INFORMATION TABLE 700

| FORMAT | |
|---|---|
| INDEX INFORMATION | ⟨INDEX=9999⟩ |
| HOT SPOT INFORMATION | ⟨HOTSPOT X=999,Y=999,GO_TO_PAGE(9999)⟩ |

701
702

("9" REPRESENTS A DECIMAL DIGIT)

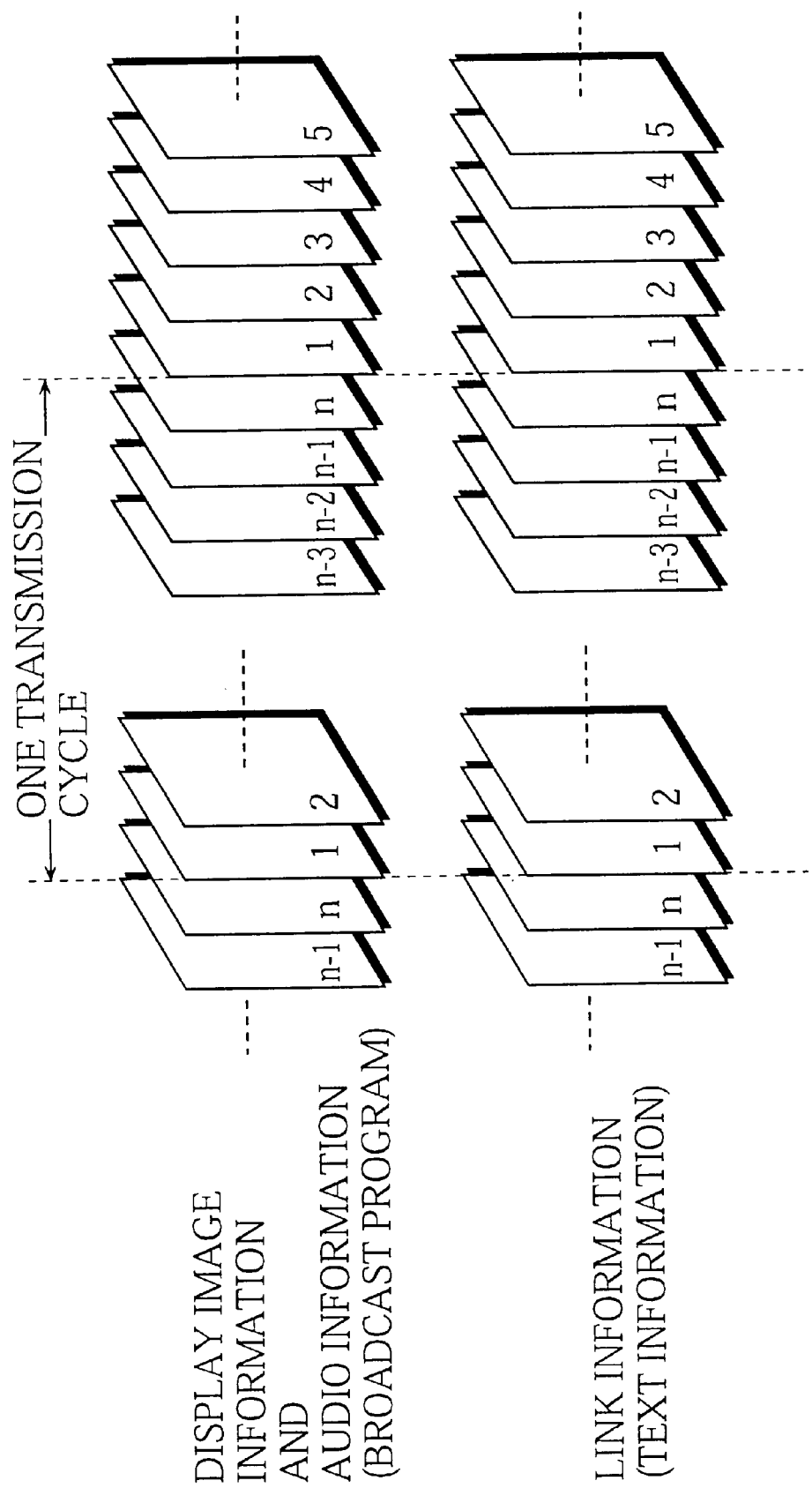

FIG. 16
| CURSOR NO. | DISPLAY POSITION(X,Y) |
|---|---|
| 1 | (100, 600) |
| 2 | (100, 700) |
| 3 | |
| 4 | |
| 5 | |
FIG. 17
DESIGN INFORMATION
| CURSOR NO. | SELECTED | NOT SELECTED |
|---|---|---|
| 1 |  |  |
| 2 |  |  |
| 3 |  |  |

FIG. 23

```
<HTML>
<H1>WEATHER REPORT</H1>
<CENTER>
<IMG SRC= "Weather.gif" >
</CENTER>
<P>TOMORROW,THE WHOLE OF JAPAN WILL ENJOY SPRINGLIKE WEATHER</P>
<UL>
<LI><A HREF= "Osaka.html" >OSAKA</A>
<LI><A HREF= "Tokyo.html" >TOKYO</A>
<LI><A HREF= "Nagoya.html" >NAGOYA</A>
<LI><A HREF= "Sendai.html" >SENDAI</A>
<LI><A HREF= "Hirosima.html" >HIROSHIMA</A>
<LI><A HREF= "Hukuoka.html" >FUKUOKA</A>
<LI><A HREF= "Sapporo.html" >SAPPORO</A>
</UL>
<P>WORLD WEATHER REPORT</P>
<UL>
<LI><A HREF= "North.html" >NORTHERN HEMISPHERE</A>
<LI><A HREF= "South.html" >SOUTHERN HEMISPHERE</A>
</UL>
</HTML>
```

Report.html

2401

```
<HTML>
<H1>OSAKA WEATHER</H1>
<UL>
<LI>TOMORROW-FINE
<LI><A HREF="Osaka_week.html">WEATHER FOR WEEK</A>
<LI><A HREF="Osaka_month.html">WEATHER FOR MONTH</A>
</UL>
<LI><A HREF="Report.html">RETURN</A>
</HTML>
```

Osaka.html

2501

Weather. gif

FIG. 28

| TAG | STARTING POSITION | FONT SIZE |
|---|---|---|
| <H1> | x=10<br>y=10 | (80,80) |
| <P> | x = 10 | (30,60) |
| <LI> | x = 10 | (30,60) |
| <CENTER> | x = 20 | — |
| ⋮ | ⋮ | ⋮ |

2802 — TAG; 2803 — STARTING POSITION; 2801 — FONT SIZE; 2804

FIG. 29

| BEFORE CONVERSION | AFTER CONVERSION |
|---|---|
| FILE NAME | Index("FILE NAME") |
| <A HREF="FILE NAME"> | HotSpot(M "FILE NAME") |
| ⋮ | ⋮ |

2901, 2902, 2903

```
Index(" Report.html" )
HotSpot(1," Osaka.html" )
HotSpot(2," Tokyo.html" )
HotSpot(3," Nagoya.html" )
HotSpot(4," Sendai.html" )
HotSpot(5," Hirosima.html" )
HotSpot(6," Hukuoka.html" )
HotSpot(7," Sapporo.html" )
```

FIG. 31

WORLD WEATHER REPORT
1   NORTHERN HEMISPHERE
2   SOUTHERN HEMISPHERE

Index(" Report1.html" )
HotSpot(1," North.html" )
HotSpot(2," South.html" )

Weather. gif

```
Index(" Report.html" )
HotSpot(1," Osaka.html" )
HotSpot(2," Tokyo.html" )
HotSpot(3," Nagoya.html" )
HotSpot(4," Sendai.html" )
HotSpot(5," Hirosima.html" )
HotSpot(6," Hukuoka.html" )
HotSpot(7," Sapporo.html" )
```

```
<HTML>
<H1>TOKYO WEATHER</H1>
<UL>
<LI>TOMORROW-FINE
<LI><A HREF="Tokyo_week.html">WEATHER FOR WEEK</A>
<LI><A HREF="Tokyo_month.html">WEATHER FOR MONTH</A>
</UL>
<LI><A HREF="Report.html">RETURN</A>
</HTML>
```

3801

Tokyo.html — 3802

DATA CONVERSION APPARATUS FOR READING A DOCUMENT FOR A DISPLAY SCREEN AND GENERATING A DISPLAY IMAGE FOR ANOTHER DISPLAY SCREEN WHICH HAS A DIFFERENT ASPECT RATIO FROM THE FORMER DISPLAY SCREEN

BACKGROUND OF THE INVENTION (1) Field of the Invention

This invention relates to a data conversion apparatus used for TV broadcasting systems, and more specifically to a data conversion apparatus for converting HTML (Hyper Text Markup Language) documents into information of a format suitable for the TV broadcasting systems.

(2) Description of the Prior Art

Recent years have seen a variety of information providing services on the Internet.

Meanwhile, in TV broadcasting systems, a change has taken place in terms of the screen size, so that a standard screen with a conventional aspect ratio (4:3) and a wide screen with aspect ratio (16:9) are now both popular.

The standard screen and the wide screen have different numbers of pixels in horizontal (X-coordinate) direction.

Due to the above difference, a blank is generated when TV programs for the standard screen, for example, are played on the wide screen. A technique has been developed to extend the display image in horizontal direction so that the blank is deleted from the screen. With this technique, however, the display image is distorted in horizontal direction.

The above phenomenon is also distinguished in reproducing of multimedia data. Multimedia data is composed of character information, image information, control information, etc. Home pages provided by WWW (World Wide Web) servers in the Internet are one example of multimedia data. Here, the display image of the multimedia on the wide screen will generate a blank if the above conventional technique is not used; the display image will be distorted if the above conventional technique is used. This is because multimedia data is created for standard PC (Personal Computer) screens which have a different number of pixels in X-coordinate direction to wide screen televisions. With the conventional technique, characters and images, such as company product images, are distorted. With such presentation, correct information may not be conveyed. That is to say, the conventional technique is unable to make effective use of the wide screen.

SUMMARY OF THE INVENTION

It is therefore the object of the present invention to provide a data conversion apparatus for converting multimedia data, which has been written for a display screen, into a display image for another display screen having a different aspect ratio, without destroying the multimedia data images.

The above object is achieved by a data conversion apparatus for reading a document, which has been written for generating a display image suitable for a first display screen, and generating a display image suitable for a second display screen, where the document includes a plurality of control statements, at least a character string, and at least a piece of image information, where each of the plurality of control statements is written along with either of the character string and the piece of image information, where the first display screen and the second display screen have different aspect ratios, the data conversion apparatus including: document obtaining unit for obtaining the document from a unit which is not included in the data conversion apparatus; screen size storing unit for storing a size of the second display screen; conversion information storing unit for storing a plurality pieces of conversion information which respectively correspond to the plurality of control statements; area storing unit for including a plurality of storage areas each of which is suitable for the size of the second display screen; display image converting unit for reading the character string and the piece of image information from the document obtained by the document obtaining unit and for converting the character string and the piece of image information respectively into display image elements according to respective pieces of conversion information stored in the conversion information storing unit; space judging unit for judging for each of the display image elements whether a space of a first storage area among the plurality of storage areas is enough to store the one of the display image elements based on a corresponding piece of conversion information stored in the conversion information storing unit; display image element writing unit for writing the one of the display image elements into the space of the first storage area when the space judging unit judges that the space of the first storage area is enough to store the one of the display image elements; and new display image element writing unit for, when the space judging unit judges that the space of the first storage area is not enough to store the one of the display image elements, writing the one of the display image elements into a second storage area among the plurality of storage areas.

With such a construction, that is, a construction in which space judging unit judges whether the storing unit includes a blank, and display image element writing unit writes the display image elements into the blank when the space judging unit judges that the storing unit includes the blank, the blank on the screen is effectively used but unnatural images are not generated.

In the above data conversion apparatus, each of the plurality pieces of conversion information may include: either of a piece of first formation information and a piece of second formation information, where the piece of first formation information is included in the piece of conversion information together with a piece of character size information on characters of a corresponding display image element converted from the character string, where the display image converting unit includes: a character string converting unit for converting the character string into the display image element according to the piece of first formation information and the piece of character size information, and an image information converting unit for converting the piece of image information into a display image element according to the piece of second formation information.

In the above data conversion apparatus, the conversion information storing unit may further include: starting positions of the display image elements on the second display screen, where the starting positions are stored with corresponding control statements, where the space judging unit includes: a calculating unit for calculating respective ending positions of the display image elements corresponding to the starting positions; a Y-coordinate judging unit for judging for each of the display image elements whether a Y coordinate value at an ending position of the one of the display image elements calculated by the calculating unit exceeds a Y coordinate value of the size of the second display screen stored in the screen size storing unit; and a first write instructing unit for instructing the display image element writing unit to write the one of the display image elements when the Y-coordinate judging unit judges that the Y coordinate value does not exceed the Y coordinate value of the size of the second display screen, where the display image element writing unit includes: a first writing unit for, on being instructed by the first write instructing unit to write, writing the one of the display image elements into the first storage area of the area storing unit starting from the starting positions.

With such constructions, it is correctly judged whether the storing unit includes a blank for storing the display image elements.

In the above data conversion apparatus, the space judging unit may further includes: an X-coordinate judging unit for judging for each of the display image elements whether an X coordinate value at the ending position of the one of the display image elements calculated by the calculating unit exceeds an X coordinate value of the size of the second display screen stored in the screen size storing unit when the Y-coordinate judging unit judges that the Y coordinate value exceeds the Y coordinate value of the size of the second display screen; a second write instructing unit for instructing the display image element writing unit to write the one of the display image elements when the X-coordinate judging unit judges that the X coordinate value does not exceed the X coordinate value of the size of the second display screen, where the display image element writing unit further includes: a second writing unit for, on being instructed by the second write instructing unit to write, writing the one of the display image elements into a blank in the first storage area, where the blank in the first storage area has X coordinate values greater than the X coordinate value of the one of the display image elements written by the first writing unit.

With such a construction, it is possible to prevent unnatural images from being generated since, for example, the display image elements are also written into the blank on the right-hand side of the screen, using the blank effectively.

In the above data conversion apparatus, the space judging unit may further include: a third write instructing unit for instructing the new display image element writing unit to write the one of the display image elements when the X coordinate judging unit judges that the X coordinate value exceeds the X coordinate value of the size of the second display screen, where the new display image element writing unit instructs the calculating unit to set the starting positions to an initial value and to calculate the ending position of the one of the display image elements on the second display screen, and writes the one of the display image elements into the second storage area.

With such a construction, a display image which cannot be displayed in a screen is displayed over a plurality of screens. As a result, the whole of the display image may be seen by switching the plurality of screens even if the scrolling function is not available.

In the above data conversion apparatus, the conversion information storing unit may further store a minimum compression rate which is applied to the display image elements converted by the image information converting unit, where the display image converting unit further includes: a display image element compressing unit for, when the space judging unit judges that space of the first storage area is not enough to store the one of the display image elements, generating a compressed image which has a size smaller than a size of the space of the first storage area, where the display image element writing unit further includes: a first compressed image writing unit for prohibiting the new display image element writing unit from writing the one of the display image elements into the second storage area and for writing the compressed image into the space of the first storage area when a compression rate of the compressed image is either of equal to and higher than the minimum compression rate; a second compressed image writing unit for, when the compression rate of the compressed image is lower than the minimum compression rate, generating a minimum compression image by compressing the one of the display image elements with the minimum compression rate, where the minimum compression image has a size greater than the size of the space in the area storing unit, writing a part of the minimum compression image into the space, and instructing the new display image element writing unit to write the rest of the minimum compression image into the second storage area.

With such a construction, when an image cannot be stored in the blank, the image is compressed with a compression rate being equal to or higher than the minimum compression rate, displaying all the images in one screen, providing a screen convenient for users.

In the above data conversion apparatus, the space judging unit may further include: a display image element write judging unit for judging whether all display image elements in the document have been written into the area storing unit; a document obtainment judging unit for judging whether the document obtaining unit has obtained another document; a document space judging unit for, when the display image element write judging unit judges that all the display image elements have been written and when the document obtainment judging unit judges that the document obtaining unit has obtained the other document, judging whether the first storage area includes a blank for storing display image elements of the other document; and an addition instructing unit for, when the document space judging unit judges that the first storage area includes the blank for storing display image elements of the other document, instructing the display image converting unit to read a character string and a piece of image information from the other document obtained by the document obtaining unit.

With such a construction, the display screen is used effectively since a plurality of images related to each other is displayed in one screen and a piece of image information is generated for the screen.

The above data conversion apparatus may be used in a data communication system as a data transmitting apparatus, where the data communication system achieves pseudo interactive communications by using one-way communications between the data transmitting apparatus and a plurality of data receiving apparatuses, the data conversion apparatus further including: link information generating unit for, when either of the character string and the piece of image information is linked to still another document, generating a piece of link information, where the piece of link information indicates that the second display screen should display a display image of the still another document, where the piece of link information is related to a display image of the document, where one of the plurality of control statements specifies the still another document linked to either of the character string and the piece of image information.

With such a construction which generates display control information, the data conversion apparatus may be used as a data transmitting apparatus in a data communication system, which achieves pseudo interactive communications by using one-way communications.

The above data conversion apparatus may further include: identifier assigning unit for assigning an identifier to a display image stored in the area storing unit and also assigning the identifier to the piece of link information generated by the link information generating unit, where the data transmitting apparatus sequentially transmits a certain number of display images to each of the plurality of data receiving apparatuses with corresponding pieces of link information.

With such a construction, it is possible for a data receiving apparatus in the data communication system to easily switch display images according to display control information, achieving the pseudo interactive communications.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 shows an example of the file list stored in the file list storing unit in the first embodiment;

FIG. 3 shows HTML document 301 "Report.html" which is the first page of a home page provided by a WWW server in the first embodiment;

FIG. 6 shows HTML document "Osaka.html" which is an image displayed on the third page of the home page in the first embodiment;

FIG. 7 shows an example of the link information table stored in the data conversion table storing unit in the first embodiment;

FIG. 11A gives a graphic representation of the transmission method used by the transmitting unit in the first embodiment;

FIG. 16 shows an example of the cursor design correspondence table which the control unit in the first embodiment generates to control the display position of the cursor design;

FIG. 17 shows an example of the design information stored by the control unit in the first embodiment;

FIG. 23 shows an example document stored in the information obtaining unit in the second embodiment;

FIG. 28 shows a font table stored in the data conversion table storing unit in the second embodiment;

FIG. 29 shows a link information conversion table stored in the data conversion table storing unit in the second embodiment;

FIG. 31 shows examples of image and link information having been converted and stored in the temporary information storage unit in the second embodiment;

FIG. 38 shows a document stored in the temporary document storing unit of the data conversion apparatus in the fourth embodiment;

DESCRIPTION OF THE PREFERRED EMBODIMENTS

First Embodiment

Figure 1:
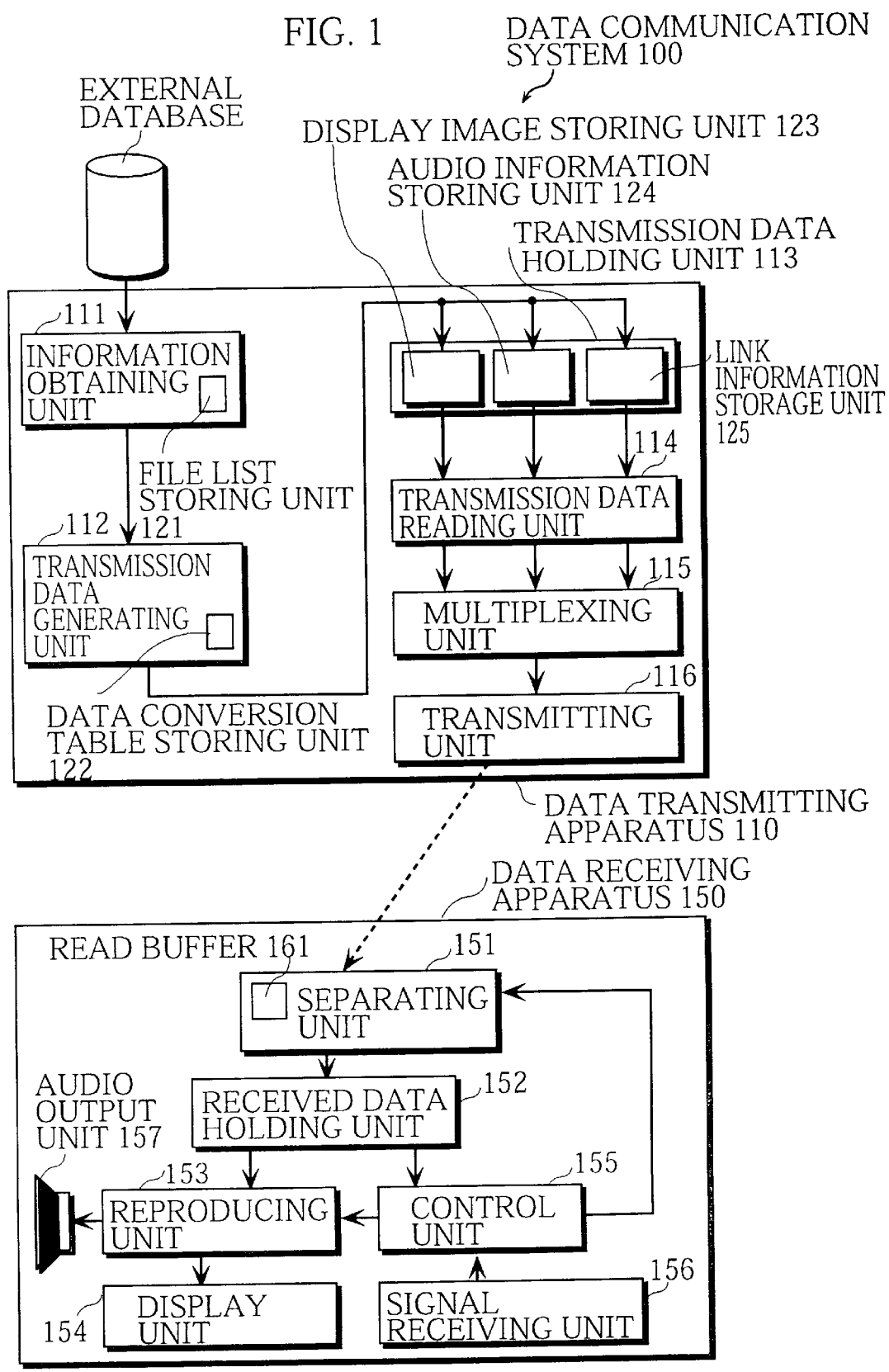
FIG. 1 is a block diagram showing the construction of the data communication system of the present invention described in the first embodiment.

FIG. 1 is a block diagram showing the construction of the data communication system 100 which is described in the present embodiment. This data communication system 100 is composed of a data transmitting apparatus 110 and a plurality of data receiving apparatuses 150.

The data transmitting apparatus 110 includes an information obtaining unit 111, a transmission data generating unit 112, a transmission data holding unit 113, a transmission data reading unit 114, a multiplexing unit 115, and a transmitting unit 116.

Each data receiving apparatus 150 includes a separating unit 151, a received data holding unit 152, a reproducing unit 153, a display unit 154, a control unit 155, a signal receiving unit 156, and an audio output unit 157.

Construction of the Information Obtaining Unit 111

The information obtaining unit 111 includes a file list storing unit 121 and a buffer (not-illustrated) which holds information obtained from an external database, such as a WWW server. The file list storing unit 121 stores a file list 200 in which the file names of files that are to be obtained by the information obtaining unit 111 and the addresses of these files are stored corresponding to serial numbers which show the order in which the files are to be obtained.

FIG. 2 shows an example of the file list 200 stored in the file list storing unit 121. In the file names given in this list, the extension "html" indicates that a file is an HTML document, the extension "gif" indicates that a file is an image which has been compressed according to GIF (Graphics Interchange Format), and the extension "au" indicates that a file is audio information in AU format.

This file list 200 shown in FIG. 2 shows the case when the information obtaining unit 111 is connected to the Internet and obtains information from WWW servers. In this example, the file list 200 is a table in which the URL (Uniform Resource Locator) of a directory on a WWW server is stored in the address column 202 corresponding to each number in the serial number column 201. In the present example, each page in a home page provided by a WWW server can be composed of an HTML document and image files and audio files whose file names are indicated by the HTML document. As a result, the file name of the HTML document for each page is grouped together with the file names of the accompanying image information files and audio files in the file name column 203 of the file list 200.

It should be noted that there can be cases when the address and file names stored in file list storing unit 121 for each serial number in the file list do not need to be recorded separately, so that they may instead be represented using a single URL. It is also possible for files to be obtained not from a WWW server, but from an external database. In this case, the address of the file is expressed as the address of a device in the external database and the file is expressed by a file address in the database.

The information obtaining unit 111 reads a URL and the file names which are to be obtained from the URL from the file list storing unit 121 in ascending order of the serial numbers in column 201. It then accesses the WWW server indicated by the URL to obtain the indicated files. The information obtaining unit 111 assigns file names to the obtained files and stores the files in the buffer.

Examples of files

The files obtained by the information obtaining unit 111 are described below, with reference to FIGS. 3, 4, 5, and 6.

FIG. 3 shows the HTML document 301 "Report.html" which is the first page of a home page provided by a WWW server. The notation 'HTML document 301 "Report.html"' indicates the file of HTML document 301 whose file name is "Report.html."

In HTML documents, character strings written inside "<>" brackets are called tags. These tags represent control codes and are used in pairs written as "<character string>" and "</character string>". The control codes in tags indicate the execution of a corresponding control operation.

Tags "<HTML>" on line 311 and "</HTML>" on line 323 in FIG. 3 indicate that the character strings between these tags form a single HTML document 301.

Tags "<H1>" and "</H1>" on line 312 indicate that the character string "WEATHER REPORT" between these tags is the headline of this document.

Tags "<CENTER>" on line 313 and "</CENTER>" on line 315 indicate that the part of the document expressed by the character strings between these tags should be centered.

Figures 4, 5:
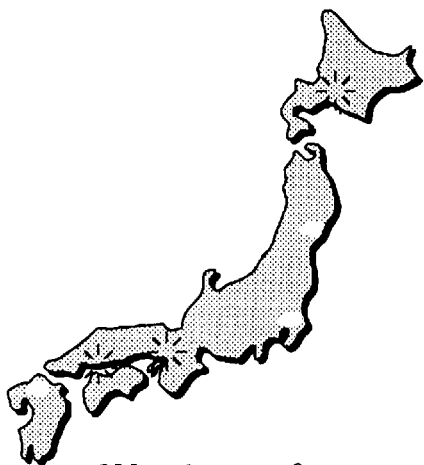
FIG. 4 shows image information "Weather.gif" which is an image displayed on the first page of the home page in the first embodiment.
FIG. 5 shows HTML document "Tokyo.html" which is an image displayed on the second page of the home page in the first embodiment.

'<IMG SRC="Weather.gif">' on line 314 indicates that the image information 401 "Weather.gif" shown in FIG. 4 is to be displayed in the document. Here, "SRC=" is an attribute of tag "<IMG>" and indicates an image information file. The attribute content of "SRC=" is "Weather.gif", indicating a file name.

FIG. 4 shows the image information 401 "Weather.gif" which is an image displayed on the first page of the home page.

As shown in FIG. 4, the image information 401 stored in image information file "Weather.gif" is a map of Japan which includes weather information.

Tags "<P>" on line 316 and "</P>" on line 317 indicate that the character string "TOMORROW, THE WHOLE OF JAPAN WILL ENJOY SPRINGLIKE WEATHER" between these tags is a single paragraph.

Tags "<UL>" on line 318 and "</UL>" on line 322 indicate that the display items expressed by the character strings between these tags are displayed as an itemized list without serial numbers.

Each of the tags "<L1>" on lines 319 and 320 indicates that the character string between this tag and the next "<L1>" or "</UL>" forms an item in the itemized list.

'<A HREF="Tokyo.html"> TOKYO </A>' on line 319 of FIG. 3 indicates that the character string "TOKYO" is linked to the HTML document 501 "Tokyo.html" which is shown in FIG. 5. Here, character strings or images which are linked to other files, such as this character string "TOKYO", are called hot spots or anchor points. As one example, if a user uses the mouse to select the hot spot "TOKYO" which displayed on a computer monitor by a browser, the HTML document 501 "Tokyo.html" will be read by the browser and is displayed on the screen. Here, the attribute of tag "<A>", "HREF=", represents a link destination, and the attribute content of "HREF=", in this case "Tokyo.html", indicates a file name for the link destination file.

'<A HREF="Osaka.html"> OSAKA </A>' on line 320 of FIG. 3 indicates that the character string "OSAKA" is linked to the HTML document 601 "Osaka.html" which is shown in FIG. 6. Accordingly, this character string "OSAKA" is also a hot spot. If hot spot "OSAKA" is selected, HTML document 601 "Osaka.html" will be displayed on the screen.

'<A HREF="Weather.au"> AUDIO INFORMATION </A>' on line 321 of FIG. 3 indicates that the character string "AUDIO INFORMATION" is linked to the audio file "Weather.au.", making it another hot spot. If the hot spot "AUDIO INFORMATION" is selected, the audio file "Weather.au." will be reproduced.

FIG. 5 shows the HTML document 501 "Tokyo.html" which is the second page of the home page. The tags included in the HTML document 501 have already been explained, so that the following explanation will only deal with the links to other pages.

'<A HREF="Report.html"> RETURN </A>' on line 511 of FIG. 5 indicates that the character string "RETURN" is linked to the HTML document 301 "Report.html" which is shown in FIG. 3.

FIG. 6 shows the HTML document 601 "Osaka.html" which is the third page of the home page.

'<A HREF="Report.html"> RETURN </A>' on line 611 of FIG. 6 indicates that the character string "RETURN" is linked to the HTML document 301 "Report.html" which is shown in FIG. 3.

The information obtaining unit 111 may obtain all the files listed in the file list 200 in order and store all of the obtained files in its buffer. Alternatively, the information obtaining unit 111 may obtain the listed files in units of one page and store the obtained files in the buffer. In this latter case, the files for a next page are only obtained after the processing of a current page has been completed by the transmission data generating unit 112.

Construction of Transmission Data Generating Unit 112

The transmission data generating unit 112 includes a data conversion table storing unit 122 and a storage area (not shown in the drawings) which is used as the work area for generating transmission data. The data conversion table storing unit 122 includes a tag table, font files, and a link information table. The tag table is a list of control operations for every available HTML tag which each has its own flag. The font files each include character fonts for TV display which are classified for different purposes. The link information table is a table which expresses the link information for hot spots in a format recognized by the data communication system 100. The work area is composed of a file storage area, a tag storage area, a character string storage area, and a flag storage area. The file storage area stores one HTML document file. The tag storage area stores the character strings which are written inside the "<>" brackets of each tag. The character string storage area stores character strings other than the ones between the "<>" brackets. The flag storage area is an area where flags which are used for controlling the generation of display image information for one frame of image data are set. The character strings stored in the tag storage area and the character string storage area are deleted when the control operations corresponding to the tags (flags) have been completed. If a plurality of flags are present in the flag storage area, the flags are set in ascending order and are reset in descending order.

FIG. 7 shows an example of the link information table 700 stored in the data conversion table storing unit 122, where the numbers, such as "9", are decimal values.

As shown in FIG. 7, the link information stored in the link information table 700 is composed of index information 701 and hot spot information 702.

Index information 701 is composed of an information identification part "INDEX=" for identifying the information as index information and a file identification number expressed as a four-figure decimal value. This file identification number is the identification number of a transmission data file which includes the current piece of index information 701.

Hot spot information 702 is composed of an information identification part "HOTSPOT=" for identifying the information as hot spot information, X-Y coordinates "X=999, Y=999", for indicating a cursor position in the current display screen, an instruction "GO_TO_PAGE" which corresponds to the cursor position given by these coordinates, and a four-figure decimal variable showing the identification number of the transmission file linked to this cursor position.

The transmission data generating unit 112 treats one set of the display image information to be generated along with the accompanying audio information and link information as a single transmission data file, based on one HTML document. Here, the transmission data generating unit 112 establishes a storage area in each of the display image information storing unit 123, the audio information storing unit 124, and the link information storing unit 125 which are provided in the transmission data holding unit 113 (described later) so that the display image information, audio information, and link information to be included in one transmission data file are interrelatedly stored. Hereinafter, the storage areas in the display image information storing unit 123, the audio information storing unit 124, and the link information storing unit 125 are respectively called the display image information storage area, the audio information storage area, and the link information storage area.

The transmission data generating unit 112 assigns a same identification number to the display image information storage area, the audio information storage area, and the link information storage area used for storing the corresponding kinds of information in a same transmission data file. Here, the transmission data generating unit 112 manages the audio information and link information in a same transmission data file as separate files which are given the same identification number. This identification number may correspond to the serial number in column 201 of the file list, which in turn corresponds to the file names of the present files which are given in column 203.

The transmission data generating unit 112 fetches an unprocessed HTML document file which has been obtained by information obtaining unit 111 from the buffer in the information obtaining unit 111 in accordance with the serial number 201 in the file list 200. The transmission data generating unit 112 then writes the file into the file storage area of the work area, in addition to generating the index information in accordance with the format of the index information 701 of the link information table 700. This generated index information is then stored at the front of the link information storage area in the transmission data holding unit 113.

The transmission data generating unit 112 reads the tags in order from the start of the HTML document and and interprets the tags by looking each tag up in the tag table to find the corresponding control operations. This interpretation of control operation is performed by writing a character string detected after a tag start sign "<" one character at a time into the tag storage area provided in the work area until a tag end sign ">" is detected. The transmission data generating unit 112 then matches the character string in the tag storage area with a tag written in the tag table.

For tags which are not "<A>", "<IMG>", or "<character string preceded by '/'>", the transmission data generating unit 112 sets a flag showing the interpreted control operation in the flag storage area provided-in the work area and stores the character strings between the start tag "<>" and the corresponding end tag "</>" into the character string storage area in the work area so as to correspond to the set flag. The storage of character strings between a pair of corresponding tags is performed in the same way as the storage of the character strings included inside the tags themselves. The transmission data generating unit 112 converts the character strings in the character string storage area into text image using the fonts in one of the font files and arranges the text image in accordance with the control operation represented by the current flag to generate display image information. This generated display image information is then added to the display image information storage area provided in the transmission data holding unit 113. Here, when a start tag "<character string>" is followed, not by a character string, but by another start tag "<another character string>", a flag is first set for the former tag in the flag storage area, before the processing is performed for the control operation indicated by the latter tag.

If the read tag is "<IMG>", the transmission data generating unit 112 fetches the image information file with the file name specified by the attribute "SRC=" from the buffer of the information obtaining unit 111, and decompresses the image information file under the format specified by the file name extension to convert the format of the image into an appropriate image data format, such as bitmap data or graphics data.

If, for example, the file name extension is ".gif", the transmission data generating unit 112 decompresses the image information file under GIF to convert the image information file into the appropriate format. If a preceding flag is set for a control operation to be performed on the converted image, the converted image is arranged in accordance with this control operation to generate display image information, otherwise the display image information is generated with the converted image being arranged in accordance with an initial setting. This generated display image information is then added to the display image information storage area.

If the read tag is "<A>", the transmission data generating unit 112 checks to see if the "link destination file" specified by attribute "HREF=" of "<A>" is an audio file which has a file name extension, such as "au", which indicates audio information. If the link destination file is an audio file, the transmission data generating unit 112 fetches the audio file from the buffer of the information obtaining unit 111 and converts the audio information into audio data of a predetermined format, before storing it in the audio information storage area.

If the link destination file is not an audio file, the transmission data generating unit 112 generates a text image for the character string between tags <A> and </A>, and arranges the text image at a display position indicated by a preceding flag, or alternatively at a display position specified by an initial setting, with a space being reserved for displaying a cursor. By doing so, the transmission data generating unit 112 generates display image information which is then added to the display image information storage area provided in the transmission data holding unit 113. The transmission data generating unit 112 then calculates the X-Y coordinates for the space reserved for the cursor display position and refers to the hot spot information 702 in the link information table 700 to generate hot spot information from the calculated X-Y coordinates and the "link destination file name" specified by the attribute "HREF=" of tag "<A>". In doing so, the transmission data generating unit 112 refers to the file list 200 and finds the serial number 201 corresponding to the file name in column 203 which in turn corresponds to the link destination file name of tag "<A>", before writing this serial number 201 into the hot spot information as the file identification number. If the link destination file name is not present in the file list 200, the transmission data generating unit 112 writes the file name of the current file into the hot spot information. After doing so, the transmission data generating unit 112 adds the generated hot spot information to the link information storage area provided in the transmission data holding unit 113.

After completing all the above processes for an HTML document, the transmission data generating unit 112 writes a graphic representation of the identification number of the display image information area at a predetermined position in the non-displayed area of the display image information stored in the display image information area. In the present embodiment, the identification number has been described as being a four-figure decimal value, although the number of decimal digits is not limited to four. The identification number may alternatively be represented in binary notation, as a combination of numerals, characters and symbols, as a graphical figure, as a bar code, or even as a file name. Here, the audio information stored in the audio information storage area and the link information stored in the link information storage area are also appended with the identification numbers of the corresponding storage areas, in the same way as with standard digital data files.

Through the processes described above, the transmission data generating unit 112 generates a first, second, and third page of transmission data 800, 900, and 1000, which are respectively the first, second, and third pages of the home page provided by the WWW server, from the HTML document 301, the audio information not shown in the drawings, the image information 401, the HTML document 501, and the HTML document 601.

Transmission Data Generated by The Transmission Data Generating Unit 112

Figure 8A:
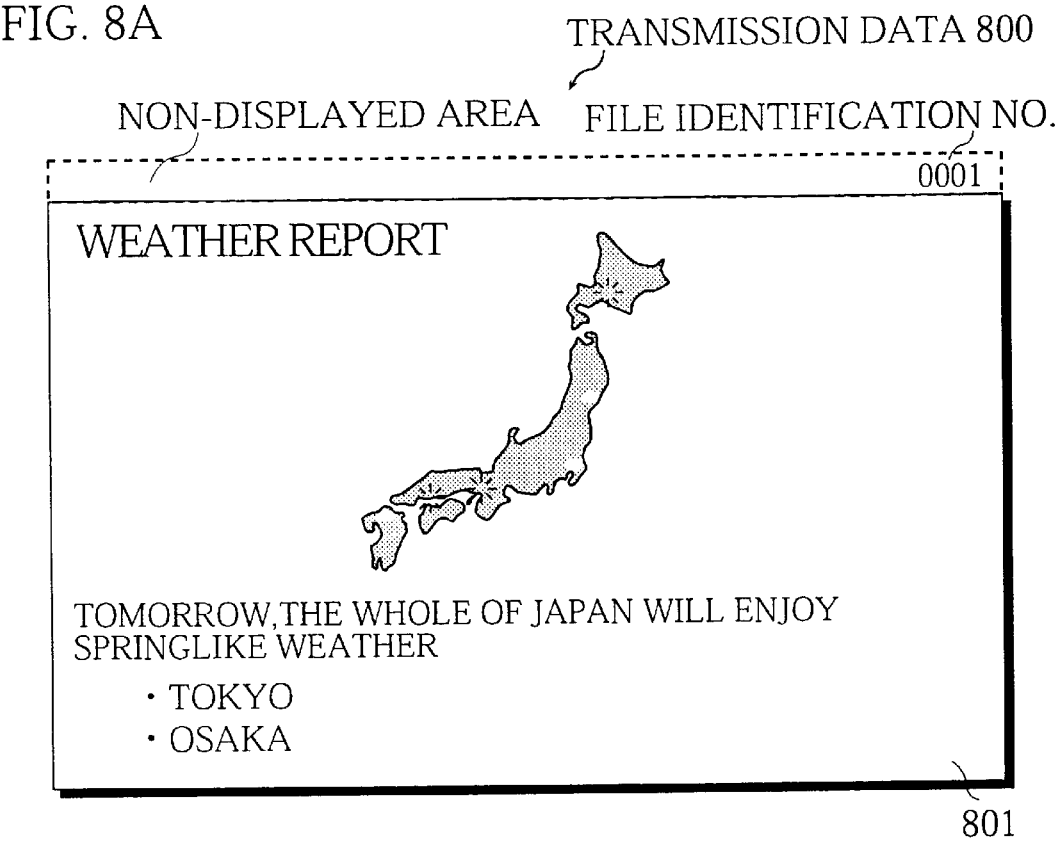
FIG. 8A shows the display image information in the first page of the home page in the first embodiment.
Figure 8B:
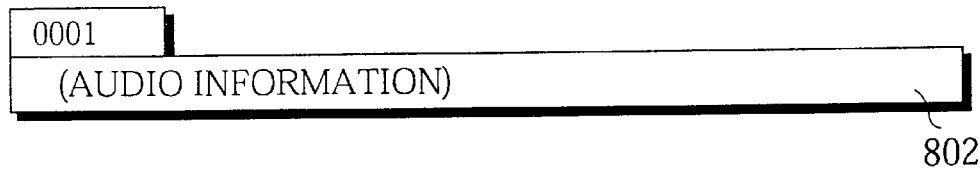
FIG. 8B shows the audio information in the first page of the home page in the first embodiment.
Figure 8C:
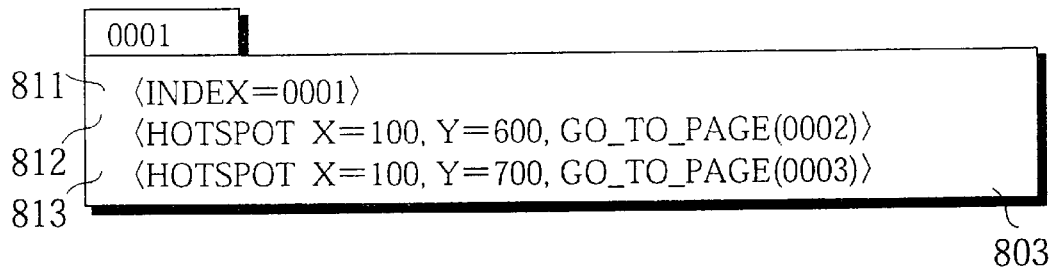
FIG. 8C shows the link information in the first page of the home page in the first embodiment.
Figure 9A:
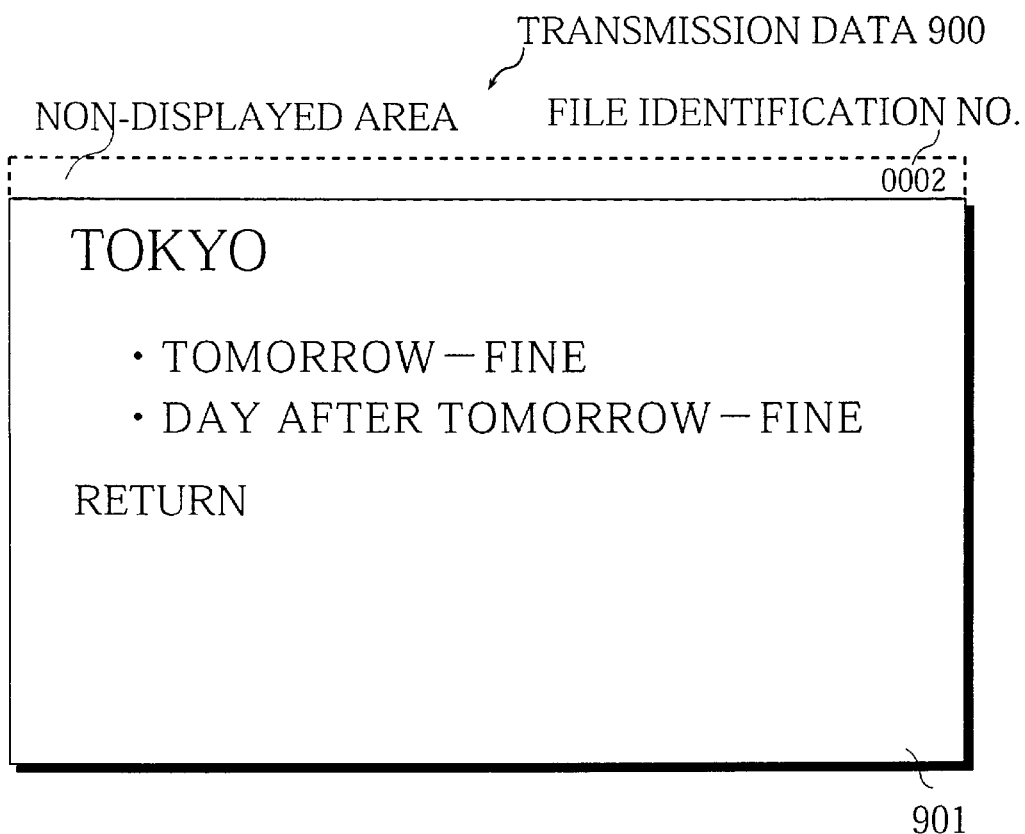
FIG. 9A shows the display image information in the second page of the home page in the first embodiment.
Figure 9B:
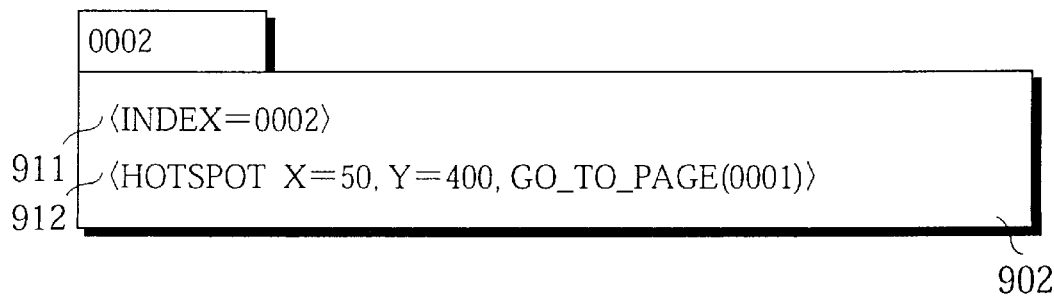
FIG. 9B shows the link information in the second page of the home page in the first embodiment.
Figure 10A:
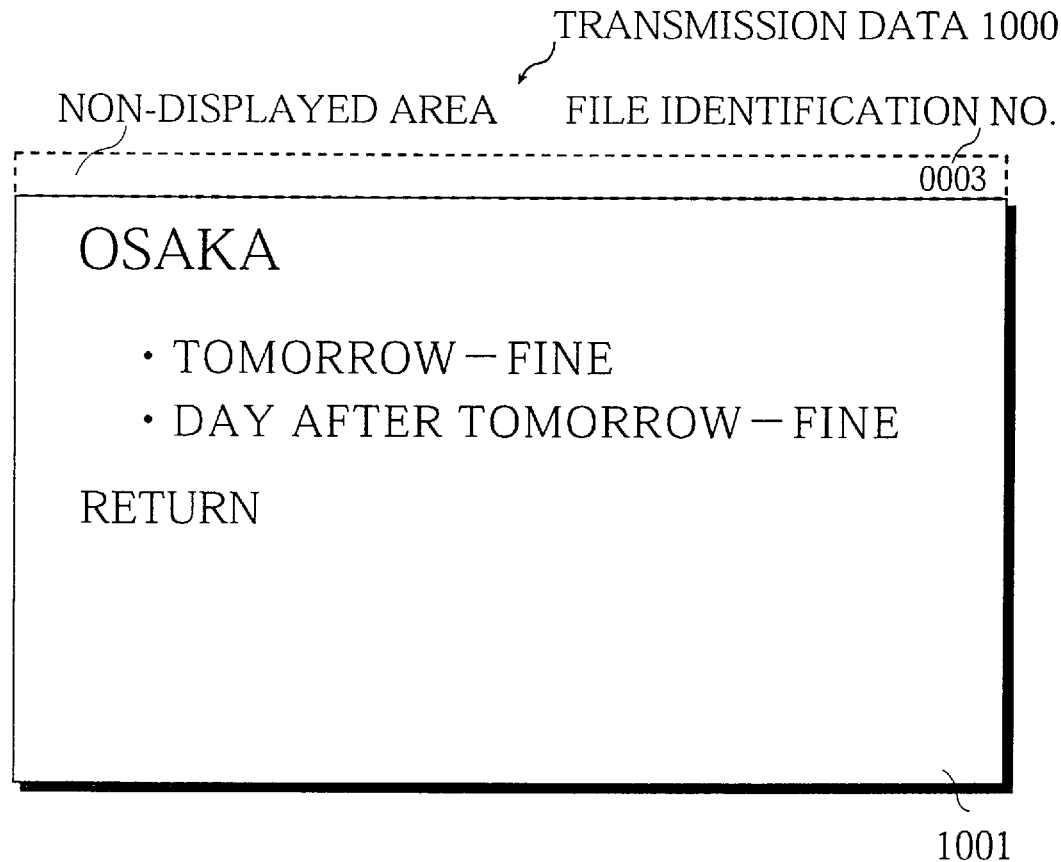
FIG. 10A and FIG. 10B show the transmission data which is the third page of the home page in the first embodiment.
Figure 10B:
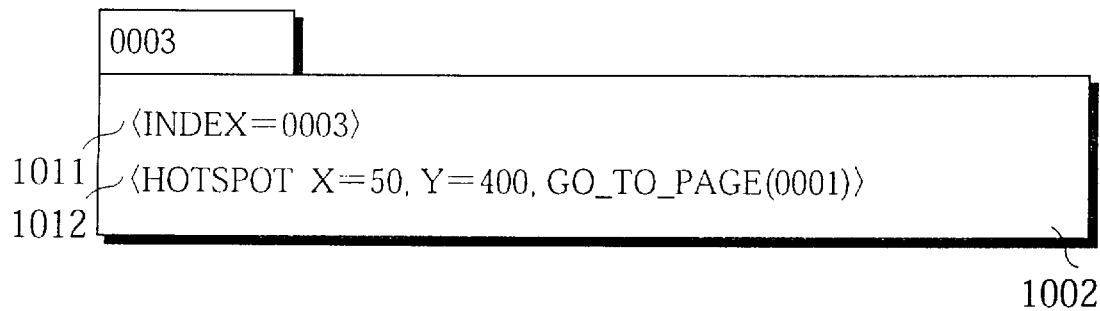

FIGS. 8A to 8C show the transmission data 800 that is the first page of the home page provided by the WWW server. This first page of transmission data 800 has been generated from the HTML document 301, the audio information "Weather.au," and the image information 401. FIGS. 9A and 9B show the transmission data 900 that is the second page of the home page provided by the WWW server which has been generated from the HTML document 501. FIGS. 10A and 10B show the third page of transmission data 1000 that is the third page of the home page which has been generated from the HTML document 601. As shown in FIGS. 8A to 8C, the transmission data 800 includes the display image information 801, the audio information 802, and the link information 803 which is related to display image information 801. Here, FIG. 8A shows the display image which is the content of the display image information 801, FIG. 8B shows a representation of the content of the audio information 802, and FIG. 8C shows the content of the link information 803.

In FIG. 8A, the area surrounded by the dotted line above the display image information 801 is a non-displayed area which is provided in each set of display image information. As its name suggests, this non-displayed area is not displayed on the screen of the display unit 154. An image of an identification number, such as "0001" shown in the drawing, is written into the top-right corner of the non-displayed area by the transmission data generating unit 112. The displayed area of display image information 801 is one display image which is composed of an image which was originally expressed as image information and character strings which have been converted from the original character code files into images.

The audio information 802 is linked to the character string "AUDIO INFORMATION" which is a hot spot in the HTML document 301. Here, the file which includes the audio information 802 is also given the identification number "0001", as shown in FIG. 8B.

The file storing the link information 803 is also given the identification number "0001", as shown in FIG. 8C. This link information 803 is used for control purposes, and is not displayed. "<INDEX=0001>" on line 811 of the link information 803 is the index information which indicates that the file identification number of the transmission data 800 is "0001".

The character string on line 812 indicates that instruction "GO_TO_PAGE(0002)" is related to a position in display image information 801 which is specified by the coordinates (100,600) and that a cursor image held by the data receiving apparatus 150 should be displayed at this position. Instruction "GO_TO_PAGE(0002)" indicates that a page having identification number "0002", which in this case corresponds to the transmission data 900, should be displayed.

The character string on line 813 indicates that the instruction "GO_TO_PAGE(0003)" is related to a position in the display image information 801 specified by the coordinates (100,700) and that a cursor image held by the data receiving apparatus 150 should be displayed at this position. This instruction "GO_TO_PAGE(0003)" indicates that a page having identification number "0003", which in this case corresponds to the transmission data 1000, should be displayed.

FIGS. 9A and 9B show the transmission data 900 which is the second page of the home page provided by the WWW server. This transmission data 900 includes the display image information 901 and the link information 902, which is related to the display image information 901. Here, FIG. 9A shows the display image which is the content of the display image information 901 and FIG. 9B shows the content of the link information 902.

As shown in FIG. 9A, an image of the identification number "0002" is written in the top-right corner of the non-displayed area of the display image information 901 which is shown by the dotted line, in the same way as with the display image information 801.

As shown in FIG. 9B, the file storing link information 902 is given the identification number "0002".

In FIG. 9B, <INDEX=0002> on line 911 is the index information, indicating that the file identification number for transmission data 900 is "0002".

The character string on line 912 indicates that the instruction "GO_TO_PAGE(0001)" is related to a position in the display image information 901 specified by coordinates (050,400) and that a cursor image held by the data receiving apparatus 150 should be displayed at this position. This instruction "GO_TO_PAGE(0001)" indicates that a page having identification number "0001" which in this case corresponds to the transmission data 800, should be displayed.

FIG. 10A and 10B show the transmission data 1000 which is the third page of the home page provided by the WWW server. Transmission data 1000 includes display image information 1001 and link information 1002, which is related to display image information 1001. Here, FIG. 10A shows the display image which is the content of the display image information 1001 and FIG. 10B shows the content of the link information 1002.

As before, an image of the identification number "0003" is written into the top-right corner of the non-displayed area of display image information 1001.

As shown in FIG. 10B, the file storing link information 1002 is given the identification number "0003".

"<INDEX=0003>" on line 1011 of the link information 1002 is the index information, indicating that the identification number of the files of the transmission data 1000 is "0003".

The character string on line 1012 indicates that the instruction "GO_TO_PAGE(0001)" is related to a position in the display image information 901 specified by the coordinates (050,400) and that a cursor image should be displayed at this position. This instruction "GO_TO PAGE (0001)" indicates that a page having identification number "0001", which in this case corresponds to transmission data 800, should be displayed.

Illustrative Example of the Processing by the Information Obtaining Unit 111 and the Transmission Data Generating Unit 112

The following is a specific example of the processing performed by the information obtaining unit 111 and the transmission data generating unit 112 in which the files shown in FIGS. 3, 4, 5, and 6 are obtained and are used to generate the transmission data shown in FIGS. 8, 9, and 10.

Processing by the Information Obtaining Unit 111

The information obtaining unit 111 first refers to the file list storing unit 121 and issues a connection request to the indicated WWW server on the Internet. The information obtaining unit 111 then obtains the HTML document 301 "Report.html" from this WWW server, assigns it the file name "Report.html", and stores the file in the buffer. The information obtaining unit 111 also obtains the compressed image information 401, the HTML document 501, and the HTML document 601 in the same way from the WWW server.

Processing by the Transmission Data Generating Unit 112

The transmission data generating unit 112 allocates storage areas in the transmission data holding unit 113 for respectively storing the display image information 801, the audio information 802, and the link information 803 which compose the transmission data 800. In doing so, the transmission data generating unit 112 assigns the identification number "0001" for retrieving transmission data 800 to these storage areas. The transmission data generating unit 112 then fetches the (yet-unprocessed) HTML document 301 from the buffer of the information obtaining unit 111 and writes this document into the file storage area in the work area.

The transmission data generating unit 112 then generates the index information "<INDEX=0001>" shown in line 811 of the transmission data 800 for the first page of the WWW home page from the file name "Report.html" of HTML document 301, before storing the generated index information at the start of the link information storage area for link information 803 which is provided in the transmission data holding unit 113.

The transmission data generating unit 112 then reads the tag "<HTML>" from line 311 in the HTML document 301 and stores the character string "HTML" in the "<HTML>" tag in the tag storage area of the work area. It then refers to the tag table stored in the data conversion table storing unit 122 to interpret the tag, and by doing so recognizes that line 311 is the first line of the HTML document 301. After doing so, it deletes the character string "HTML" from the tag storage area.

Next, the transmission data generating unit 112 reads the tag "<H1>" on line 312 and refers to the tag table to interpret its content. On doing so, it sets the headline flag in the flag storage area in the work area. Here, the headline flag shows that the character string following the "<H1>" tag is a headline and so should be displayed using a headline font. The characters in the character string after the "<H1>" tag are then written one character at a time into the character string storage area until the "</H1>" tag appears, which in the present case results in the character string "WEATHER REPORT" being written into the character string storage area and being converted into display image information using the headline font. This generated display image information is then added to the display image information storage area set in the transmission data holding unit 113. After this, the headline flag in the work area is reset, the character string "WEATHER REPORT" is deleted from the character string storage area, and the character string "H1" is deleted from the tag storage area.

Next, the transmission data generating unit 112 reads the tag "<CENTER>" on line 313 and sets the centering flag in the work area. The centering flag shows that the character string which follows the corresponding tag is to be centered on the display. Here, there is no character string following the "<CENTER>" tag which can be centered, so that the transmission data generating unit 112 continues by reading line 314.

The transmission data generating unit 112 reads the tag '<IMG SRC="Weather.gif">' on line 314 and refers to the tag table to interpret the content of the tag. The transmission data generating unit 112 then investigates whether the file for the image information 401, which is expressed by the file name "Weather.gif" is present in the buffer of the information obtaining unit 111, and, since this is the case, reads the file. The transmission data generating unit 112 then converts the image information 401 which is stored and compressed in the read file into a bitmap image or other such format, in accordance with a GIF decompression method.

The transmission data generating unit 112 then reads the tag "</CENTER>" on line 315 and arranges the bitmap image converted from image information 401 in accordance with the centering flag set in the work area. The display image information thus generated is then added to the display image information storage area in the transmission data holding unit 113, before the centering flag in the work area is reset.

The transmission data generating unit 112 then reads the "<P>" tag on line 316 and sets the paragraph flag. The paragraph flag shows that the character strings displayed between this start tag and the "</P>" end tag should be displayed as a single paragraph which is to be inserted into the following blank line. As with "WEATHER REPORT" on line 312, the character string "TOMORROW, THE WHOLE OF JAPAN WILL ENJOY SPRINGLIKE WEATHER" between these tags is read and is stored in the character string storage area in the work area. Next, after reading the "</P>" tag, the transmission data generating unit 112 converts the character string "TOMORROW, THE WHOLE OF JAPAN WILL ENJOY SPRINGLIKE WEATHER" into an image using the font for paragraph display which is stored as one of the font files and adds the generated display image information to the storage area in the transmission data holding unit 113 for display image information storage area 801. After this, the content of the work area is cleared as before.

The transmission data generating unit 112 next reads the tag "<UL>" on line 318, interprets it, and sets the itemized list flag in the work area. The itemized list flag shows that each character string which follows the tag and is interpreted as one item should be displayed as a non-numbered item in a list.

The transmission data generating unit 112 next reads the tag "<L1>" on line 319, refers to the tag table, interprets the tag as indicating the start of one item in a list, and sets the item flag in the flag storage area. The item flag shows that the display position on the display screen should be shifted to the next line every time an "<L1>" or "</L1>" tag is read.

The transmission data generating unit 112 reads the tag "<A HREF="Tokyo.html>" following the tag "<L1>" and writes it into the tag storage area. The transmission data generating unit 112 then interprets this tag "<A HREF="Tokyo.html>" and sets the link flag in the flag storage area.

When the extension of the file name given as the attribute of the "<A>" tag indicates audio information, the link flag shows that processing for the audio information is to be performed so that the audio information is converted into a predetermined format and stored in the audio information storage area. When the extension of the file name given as the attribute of the "<A>" tag does not indicate audio information, the link flag shows that the character string between the "<A>" and "</A>" tags which is appended with the link by the "<A>" tags is to be converted into an image with a two-character space provided before it as a cursor display area. The link flag also shows that display image information is to be generated for this character string in addition to hot spot information which is generated in accordance with the format of the hot spot information 702.

The transmission data generating unit 112 reads the character string "TOKYO" between the "<A HREF="Tokyo.html>" and "</A>" tags and writes it into the character string storage area. After reading the "</A>" tag, the transmission data generating unit 112 converts the character string "TOKYO" into an image with a two-character space provided before it as a cursor display area and arranges the character string in accordance with the itemized list flag to generate display image information which it adds to the display image information storage area provided in the transmission data holding unit 113. The transmission data generating unit 112 then calculates the coordinates of the cursor display position as (100,600), and uses these coordinates and the attribute "Tokyo.html" stored in the tag storage area of the work area to generate the hot spot information shown on line 812 of FIG. 8. After doing so, the transmission data generating unit 112 adds the generated hot spot information to the link information storage area provided in the transmission data holding unit 113. Having done so, the transmission data generating unit 112 deletes the character string "A HREF="Tokyo.html" in the tag storage area of the work area and the character string "TOKYO" in the character string storage area, in addition to resetting the link flag.

Next, on reading the "<L1>" tag on line 320, the transmission data generating unit 112 shifts the display position for the next display image to the following line in accordance with the item flag, and, in the same way as with line 319, generates display image information for the character string "OSAKA", in addition to generating the hot spot information shown on line 813 of FIG. 8C. The generated display image information is then added to the display image information storage area provided in the transmission data holding unit 113 and the generated hot spot information is added to the link information storage area. After this, the transmission data generating unit 112 deletes the character string "A HREF="Osaka.html" and the character string "OSAKA", and resets the link flag.

Next, on reading the "<L1>" tag on line 321, the transmission data generating unit 112 shifts the display position for the next display image to the following line in accordance with the item flag, and sets the link flag in accordance with the tag "A HREF="Weather.au". On investigating the file name extension of the attribute in accordance with the link flag, the transmission data generating unit 112 finds that the link destination file is audio information in AU format, so that it converts the AU format audio information into audio information of a predetermined format, before storing the converted audio information in the audio information storage area provided in the transmission data holding unit 113.

Next, on reading the "</L1>" tag on line 322, the transmission data generating unit 112 interprets that the itemized list is complete, and resets the itemized list flag and the item flag.

Finally, on reading the "</HTML>" tag on line 323, the transmission data generating unit 112 interprets that the HTML document 301 has ended, and so terminates the generation process for transmission data 800.

Following this, the transmission data generating unit 112 finds that there is an unprocessed HTML document 501 and so sets a display image information storage area for display image information 901 and a link information storage area for link information 902 in the transmission data holding unit 113 for storing the composite parts of the transmission data 900, in doing so giving both storage areas the identification number "0002" for the retrieval of the transmission data 900. It then reads the unprocessed HTML document 501 from the buffer of the information obtaining unit 111 and writes it into the work area.

The transmission data generating unit 112 then generates the index information "<INDEX=0002>" shown in line 911 of the transmission data 900 which displays the second page of the WWW home page from the file name "Tokyo.html" of the HTML document 501, before storing the generated index information at the start of the link information storage area for the link information 902 which is provided in the transmission data holding unit 113. In the same way as with the generation of the transmission data 800 from the HTML document 301 and the image information 401, the transmission data generating unit 112 then generates the transmission data 900 from the HTML document 501 and the transmission data 1000 from the HTML document 601, with no further explanation of this process being given.

Construction of the Transmission Data Holding Unit 113, the Transmission Data Reading Unit 114, the Multiplexing Unit 115, and the Transmitting Unit 116

The transmission data holding unit 113 includes a display image information storing unit 123, an audio information storing unit 124, and a link information storing unit 125, with simultaneous retrieval from these units being possible.

The display image information storing unit 123 can be realized by RAM (Random Access Memory) or a hard disk device, and is provided with a plurality of display image information storage areas which are set by the transmission data generating unit 112. Each of these display image information storage areas stores one file of display image information which is generated by the transmission data generating unit 112.

The audio information storing unit 124 can also be realized by RAM (Random Access Memory) or a hard disk device, and is provided with a plurality of audio information storage areas which are set by the transmission data generating unit 112. Each of these audio information storage areas stores one file of audio information which is generated by the transmission data generating unit 112.

The link information storing unit 125 can also be realized by RAM (Random Access Memory) or a hard disk device, and is provided with a plurality of link information storage areas which are set by the transmission data generating unit 112. Each of these link information storage areas stores one file of link information which is generated by the transmission data generating unit 112.

The transmission data reading unit 114 simultaneously reads the display image information, the audio information, and the link information in a same transmission data file from the storage areas provided in the transmission data holding unit 113 in the order of the file identification numbers for the transmission data, and outputs the read information to the multiplexing unit 115. After reading the files for the transmission data which has the final identification number, the transmission data reading unit 114 returns to the transmission data with the identification number "0001" and once again reads the transmission data in the order of the identification numbers. This is to say, the transmission data reading unit 114 cyclically reads the transmission data from the transmission data holding unit 113 in order of identification numbers and outputs the transmission data to the multiplexing unit 115. In doing so, there is the following difference in the reading method when audio information is or is not present. When no audio information is present, the transmission data reading unit 114 advances to the reading of a set of transmission data with the next identification number after reading a first set of transmission data once. When audio information is present, the transmission data reading unit 114 reads the audio information and advances to the reading of a set of transmission data with the next identification number only after reading the display image information and the link information a plurality of times for the period which is required by the reproduction of the audio information. As one example, if the audio information has a reproduction period of two seconds, the transmission data reading unit 114 will read the audio information once, and will read the display image information and link information 60 times (30 frames per second * 2 seconds), before advancing to ;the reading of a set transmission data with the next identification number. In this way, the transmission time for audio information can be maintained.

The multiplexing unit 115 multiplexes the display image information (including the audio information) and the link information read by the transmission data reading unit 114, and outputs multiplexed data to the transmitting unit 116. Here, this multiplexing can be performed using the same method as conventional teletext broadcasting. In such a case, display image information and audio information are multiplexed in the same way as the images and audio included in conventional TV broadcasts, while link information is multiplexed in the same way as the text information multiplexed with teletext broadcasts. This is to say, when no audio information is present, the display image information is transmitted in the image section of one frame of the television image signal, while the link information is transmitted in the retrace section of the same one frame of the television image signal. When audio information is present, the audio information is transmitted as the television audio signal, while the corresponding display image information and link information are transmitted in the image area and retrace area, respectively, of the television image signal for the number of frames required by the reproduction of the audio information.

The transmitting unit 116 successively transmits the transmission data which has been multiplexed by the multiplexing unit 115 on a TV broadcast ground wave.

Transmission Method for the Transmission Data

FIG. 11A gives a graphic representation of the transmission method used by the transmitting unit 116. FIG. 11A shows the case when n pages (n being a positive integer) of transmission data are generated by the transmission data generating unit 112. In FIG. 11A, a pairing of audio information and display image information with a same identification number is expressed as one transmission unit corresponding to a normal TV broadcast, and the link information for the same identification number is expressed as one transmission unit corresponding to the text information which is multiplexed into a standard teletext broadcast.

As shown in FIG. 11A, in addition to being identified by the same identification number, the display image information, audio information, and link information stored in one transmission data file are transmitted at a corresponding time. Also, the transmission data from the first to the $n^{th}$ page in the transmission data holding unit 113 are cyclically transmitted in the order of identification numbers.

It should be noted here that while the transmission data reading unit 114 has been described as reading the display image information, the audio information, and the link information stored in the same transmission data file simultaneously from the display image information storing unit 123, the audio information storing unit 124, and the link information storing unit 125 and as having the read display image information, audio information, and link information transmitted with related identification numbers and transmission timing, the display image information and the link information do not need to be transmitted with a related timing. As one example, the transmission data reading unit 114 may instead be composed of a first reading unit and a second reading unit. Here, the first reading unit is constructed to continuously read pairs of display image information from the display image information storing unit 123 and audio information from the audio information storing unit 124 which it then outputs to the multiplexing unit 115. The second reading unit is constructed to continuously read only the link information from the link information storing unit 125 which it then outputs to the multiplexing unit 115. By doing so, the display image information and link information belonging to a same transmission data file do not need to be transmitted by the transmitting unit 116 at the same time, since the data receiving apparatus 150 can use the identification number commonly given to the display image information and the link information to recombine pairs of the display image information and the link information.

The multiplexing unit 115 has also been described as multiplexing the display image information (including the audio information) and the link information which are generated by the transmission data generating unit 112, with the transmitting unit 116 transmitting the transmission data which has been multiplexed by the multiplexing unit 115 on a TV broadcast ground wave, although the display image information and link information do not need to be multiplexed together for transmission. As one example, the display image information and the audio information may be transmitted on a TV broadcast ground wave or as a digital satellite broadcast, while the link information may be transmitted using a telephone link and modem, or the like. Transmission here may alternatively be performed using multiple channels.

When digital satellite broadcasting is used as the data transmission method, compression/encryption and multiplexing may be performed according to MPEG2 (Moving Pictures Experts Group) video standard and system standard, so that display image information may be set as I pictures, with the audio information and link information being set as private information. Here, when it is possible for the display image information, audio information, and link information to be transmitted as digital data, it is no longer necessary to write a graphic representation of the identification number into the non-displayed area of the display image information, so that the identification number can be simply appended to the display image information and audio information, in the same way as with the link information. Incidentally, a detailed description of MPEG2 standard is given in "Saishin MPEG Kyoukasho [Latest MPEG Reader]" published by ASCII Publishing, Inc.

Figure 11B:
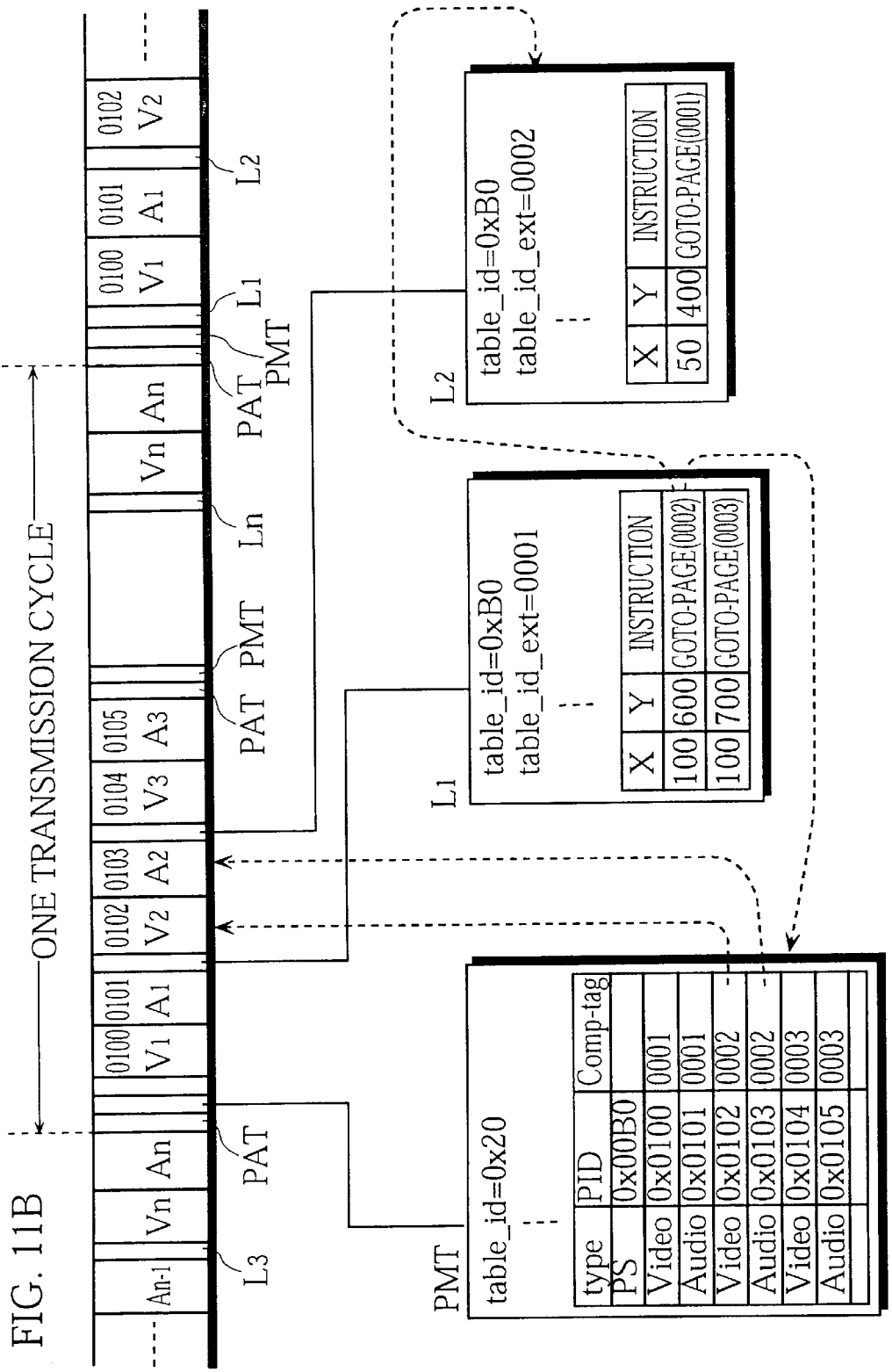
FIG. 11B shows the multiplexed stream which is transmitted when digital satellite broadcasting is used in the first embodiment.

FIG. 11B shows the multiplexed stream which is transmitted when digital satellite broadcasting is used. The upper part of this drawing shows a transport stream under MPEG2 standard which has been generated by the multiplexing unit 115.

The symbols "V1, A1, L1" in the transport stream represent the display image information, audio information, and link information which have the identification number "0001" and which are read from the transmission data file and multiplexed together. This is also the case for "V2, A2, L2" . . . "Vn, An, Ln".

"V1" is a video elementary stream which shows the display image information which has been converted into I (Intra) pictures under MPEG2 standard, with the PID (Packet IDentifier) "0x0100" having been attached to identify the stream. This is also the case for "V2" . . . "Vn".

"A1" is an audio elementary stream which shows the audio information which has been converted under MPEG2 standard, with the PID "0x0101" having been attached to identify the stream. This is also the case for "A2". . . "An".

"L1–Ln" are private sections according to MPEG2 standard for attaching each set of link information, with the PID "0xB0" having been attached to identify these as private sections. Here, identification numbers are also set in the table ID extensions to identify separate sets of link information. Each of these sets of link information is set at least one pairing of one part of the image area of the corresponding display image and information showing a link to another display image. As one example, in "L1", the display area centered on the coordinates (X,Y)=(100,600) is set the link "GOTO_PAGE(0002)" representing a link to the display image with the identification number "0002", while the display area centered on the coordinates (X,Y)=(100,700) is set the link "GOTO_PAGE(0003)" representing a link to the display image with the identification number "0003".

The correspondence between the PIDs described above and the identification numbers is set according to the PMT (Program Map Table) under MPEG2 standard. Here, the correspondence between the PIDs and the identification numbers can be written in the descriptors of the private sections, such as by setting the identification numbers as the component tags in the PMT, as shown in FIG. 11B.

In the above case, the video elementary stream, audio elementary stream, and private sections are generated by the transmission data generating unit 112 and are stored in the transmission data holding unit 113. Here, a set of one video elementary stream, one audio elementary stream, and one private section stored in the transmission data holding unit 113 corresponds to one transmission data file. Here, the video elementary stream, audio elementary stream, and private section stored as one set in the transmission data holding unit 113 are each read once, with the transmission data reading unit 114 cyclically reading all of the transmission data files. Using this data, transport streams are generated by the multiplexing unit 115.

As described above, by multiplexing n sets of display image information, audio information, and link information with a PMT in the transport stream, transmission data can be easily transmitted using digital satellite broadcasting.

Overview of the Procedure of the Data Transmitting Apparatus 110

Figure 12:
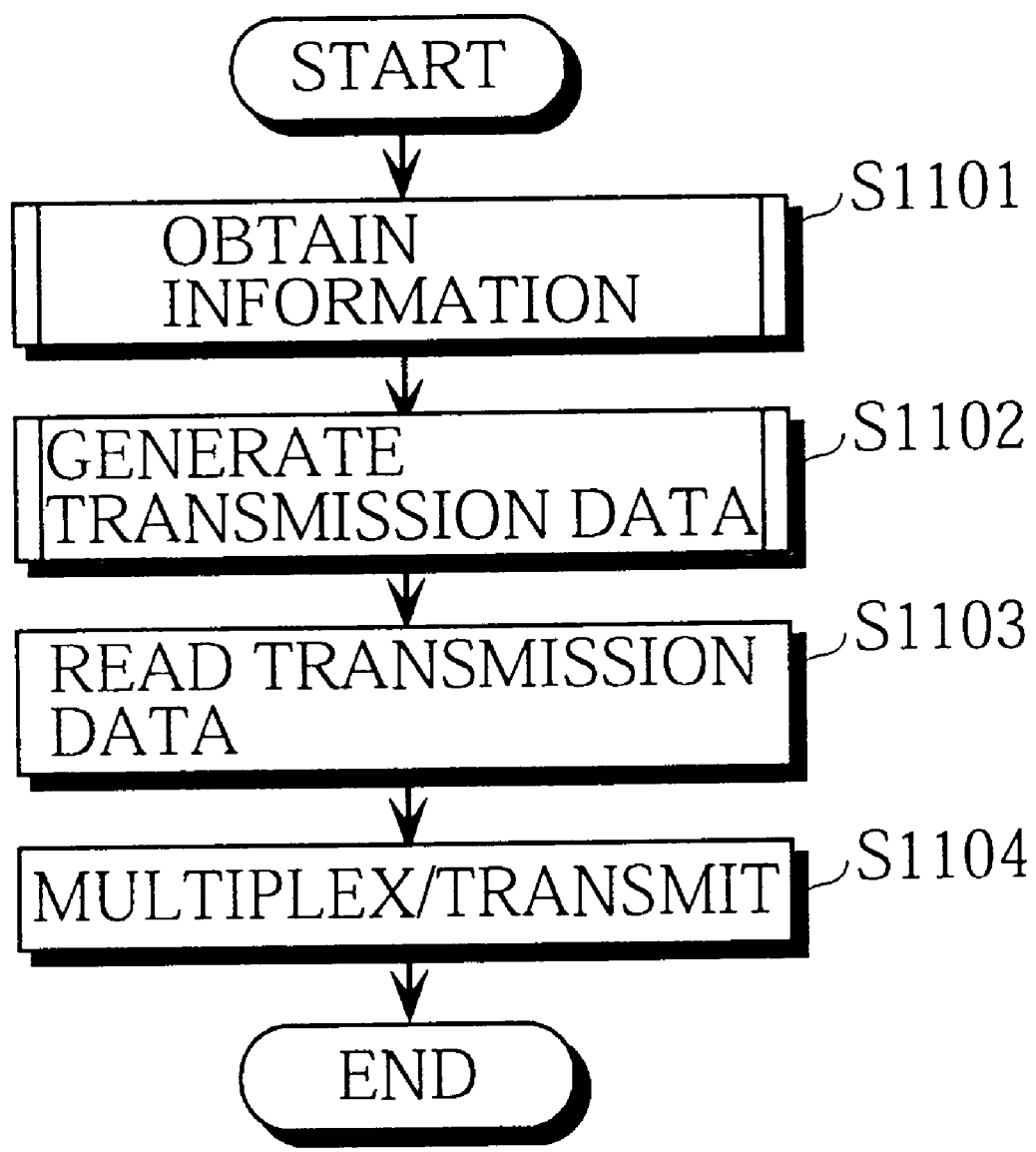
FIG. 12 is a flowchart showing an overview of the procedure of the data transmitting apparatus in the first embodiment.
Figure 13:
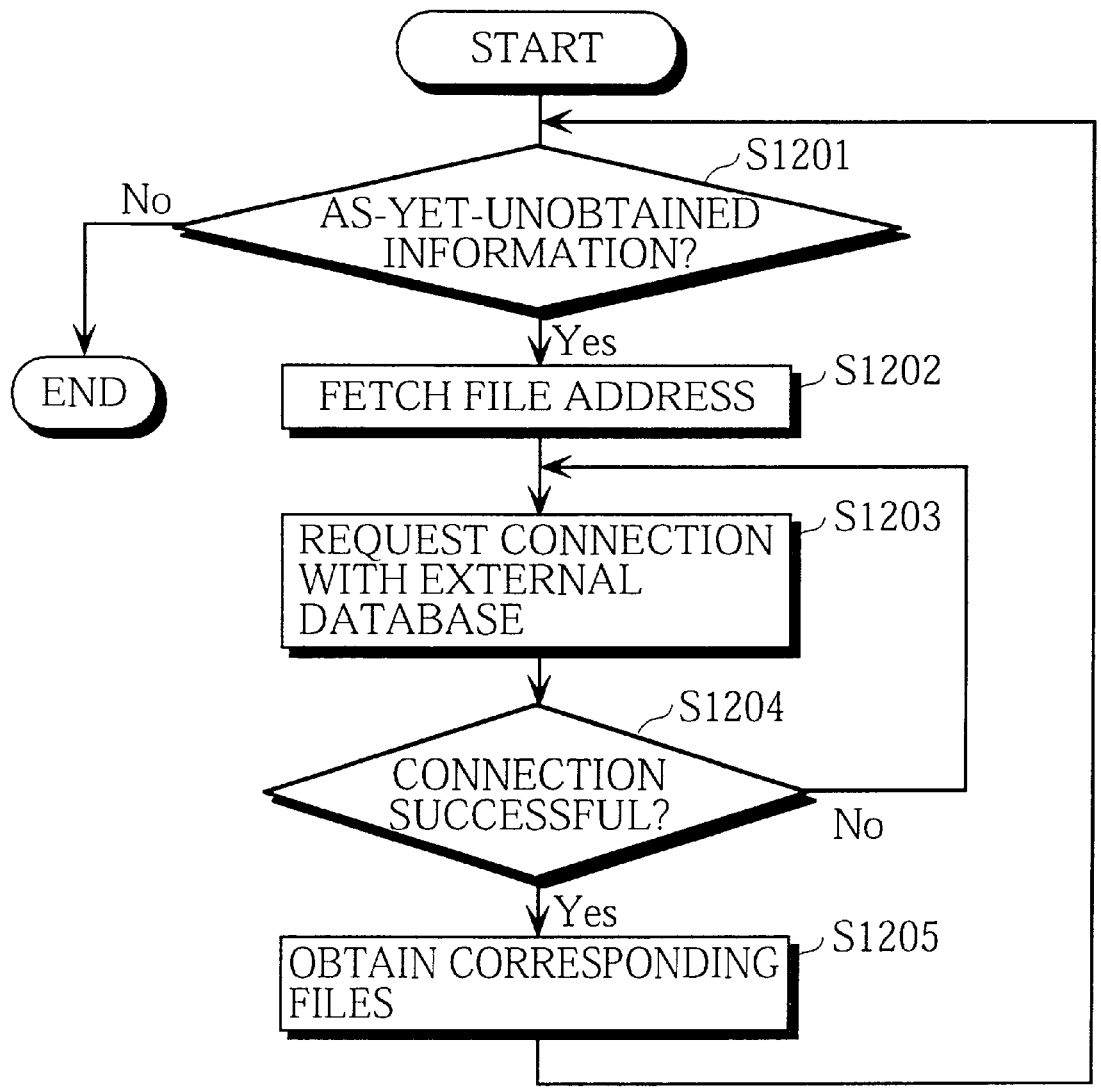
FIG. 13 is a flowchart showing an example information obtaining procedure of the information obtaining unit in the first embodiment.
Figure 14:
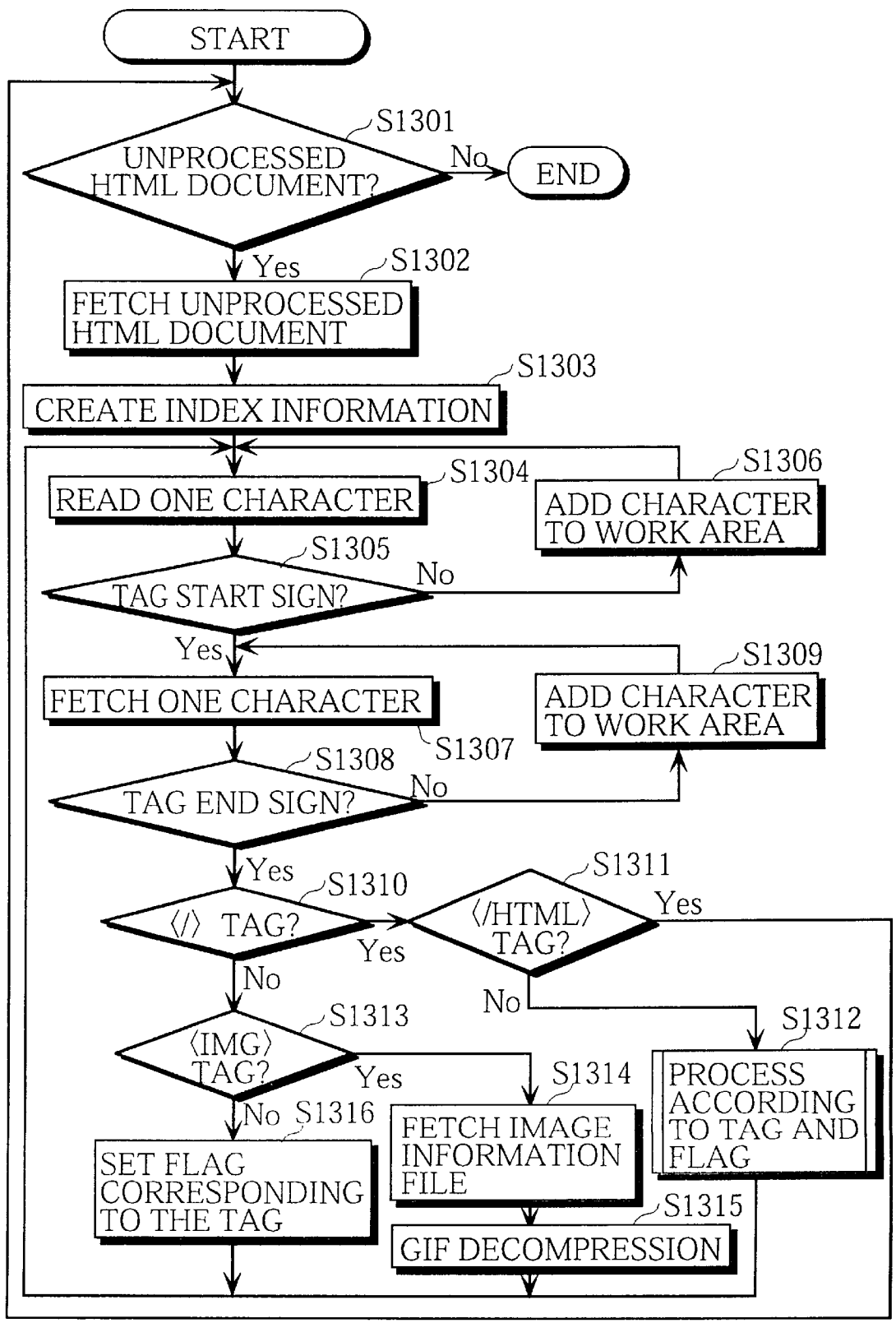
FIG. 14 is a flowchart showing an example procedure for generating transmission data by the transmission data generating unit in the first embodiment.

The following is a detailed explanation of the procedure of the data transmitting apparatus 110, with reference to FIGS. 12 to 14.

FIG. 12 is a flowchart showing an overview of the procedure of the data transmitting apparatus 110.

The information obtaining unit 111 obtains a desired set of information from an external database and stores it in its internal buffer (step S1101).

The transmission data generating unit 112 interprets the information obtained by the information obtaining unit 111 and generates display image information, audio information, and link information, which it stores in the transmission data holding unit 113 (step S1102).

The transmission data reading unit 114 successively reads the transmission data from the transmission data holding unit 113 in order of identification numbers (step S1103).

The multiplexing unit 115 multiplexes the display image information (including the audio information) with the link information, and the transmitting unit 116 transmits the multiplexed transmission data using a television broadcast ground wave.

Procedure of the Information Obtaining Unit 111

FIG. 13 is a flowchart showing an example information obtaining procedure of the information obtaining unit 111.

The information obtaining unit 111 first refers to the file list in the file list storing unit 121 and checks whether there is any as-yet-unobtained information (step S1201). If there is not, the information obtaining procedure is terminated. If there is, the file addresses (or URLs) of the as-yet-unobtained sets of information are fetched one at a time (step S1202).

The information obtaining unit 111 then requests a connection with an external database, based on the fetched address (step S1203), and checks whether the connection has been successively established (step S1204). If the connection is unsuccessful, the processing returns to step S1203 (step S1204).

If the connection has been successful, the information obtaining unit 111 reads the file names of the as-yet-unobtained information from the file list, obtains the corresponding files from the external database, and stores them in the internal buffer (step S1205). The processing then returns to step S1201.

Procedure of the Transmission Data Generating Unit 112

FIG. 14 is a flowchart showing an example procedure for generating transmission data by the transmission data generating unit 112.

The transmission data generating unit 112 first refers to the buffer in the information obtaining unit 111 and checks whether any unprocessed HTML documents exist (step S1301). If no such documents exist, the display image generating procedure is terminated. If there is such a document, the transmission data generating unit 112 establishes the transmission data storage areas in the transmission data holding unit 113, assigns an identification number to each transmission data storage area, and then fetches an unprocessed HTML document from the buffer (step S1302).

The transmission data generating unit 112 creates index information indicative of the file name of the transmission data from the file name of the fetched HTML document, and adds the index information to the link information storage area established in the transmission data holding unit 113 (step S1303).

One character is read from the fetched HTML document and is written into the character string storage area (step S1304).

The transmission data generating unit 112 then checks whether the read character is a tag start sign "<" (step S1305). If so, the processing advances to step S1307, or if not, the character is added to the character string storage area in the work area, and the processing returns to step S1304 (step S1306).

The next character is read (step S1307), and the transmission data generating unit 112 judges whether the read character is a tag end sign ">" (step S1308). If so, the processing advances to step S1310, or if not, the read character is added to the tag storage area in the working area, before the processing returns to step S1307 (step S1309).

The character string in the tag storage area is compared with the tag table, and a check is performed to see whether it starts with a "/" sign (step S1310). If it does, the transmission data generating unit 112 judges whether the read tag is a "</HTML>" tag (step S1311). If so, the transmission data generating unit 112 resets the work area, and the processing returns to step S1310. If the read tag is not "</HTML>", the transmission data generating unit 112 operates in accordance with the least significant of the flags set in the flag storage area corresponding to this read tag, and resets the corresponding storage area in the work area (step S1312), before the processing returns to step S1304.

In step S1310, when the character string does not start with "/", a check is performed to see whether the read tag is "<IMG>" (step S1313). If so, the transmission data generating unit 112 fetches the image information file specified by the attribute of the "<IMG>" tag from the buffer in the information obtaining unit 111 (step S1314). The fetched image information is converted in accordance with a GIF decompression method into image information expressed as bitmap data (step S1315), and the processing returns to step S1304.

If the read tag is not "<IMG>", the character string in the tag storage area is compared with the content of the tag table and a flag corresponding to the tag is set in the flag storage area. The transmission data generating unit 112 then operates in accordance with this tag (step S1316), before the processing returns to step S1304.

A variety of tags can be employed in the HTML documents, and the processes represented by these tags can be performed in the same way as a conventional browser. Accordingly, the following explanation focuses on an example of the processing in step S1312 for the tag "</A>" which relates to the link information which generated in a special format for this data communication system 100.

Figure 15:
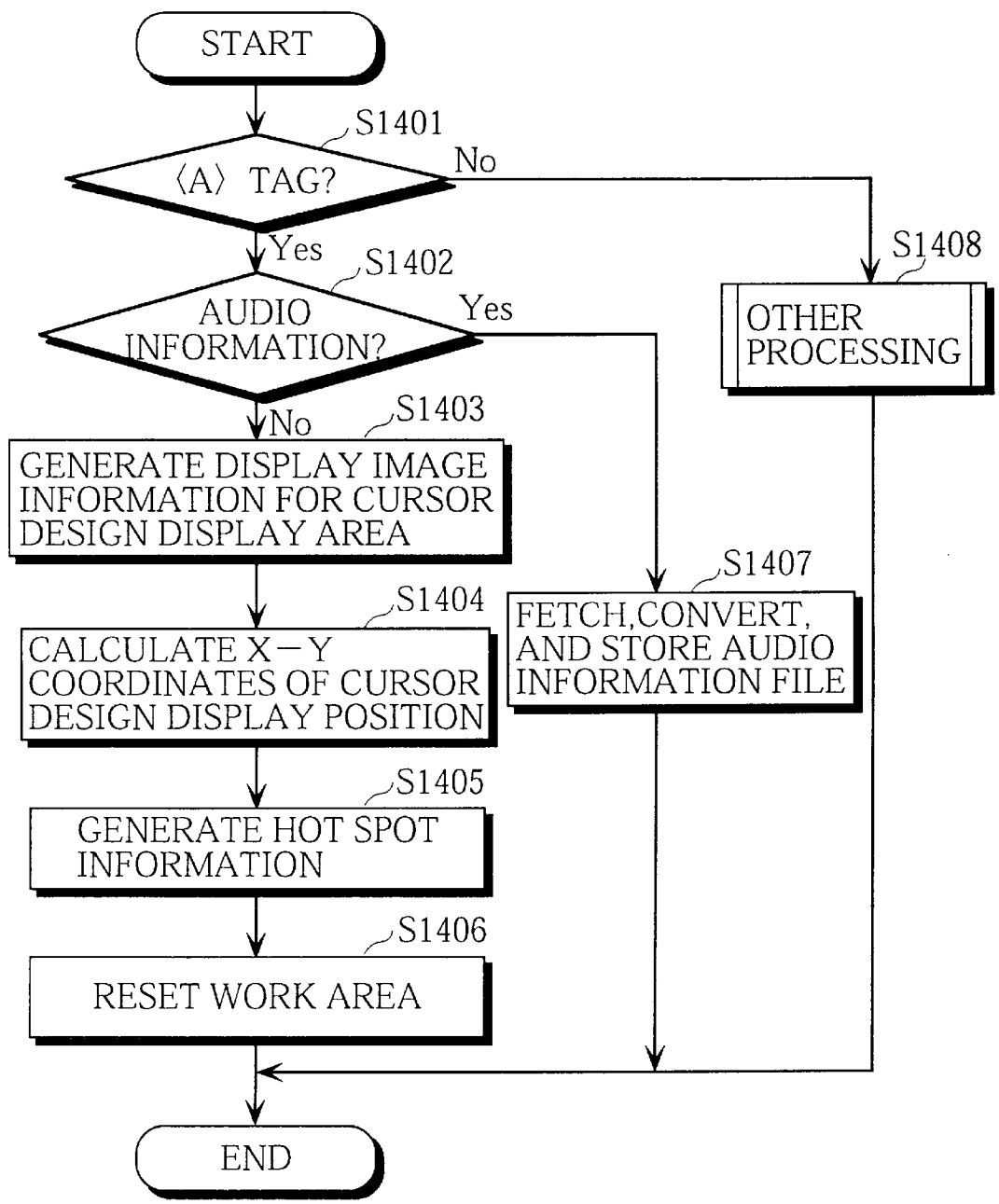
FIG. 15 is a flowchart showing a detailed example of the processing in step S1312 of FIG. 14.

FIG. 15 is a flowchart showing a detailed example of the processing in step S1312 of FIG. 14.

The transmission data generating unit 112 first checks whether the read tag is "<A>" (step S1401), and if not, the processing advances to step S1408.

If the read tag is "<A>", the transmission data generating unit 112 judges whether the link destination file specified by the attribute is an audio information file (step S1402). If it is, the processing advances to step S1407, or if not, the transmission data generating unit 112 generates display image information for the character string established in the character string storage area, in doing so leaving a display area for displaying a cursor design, before adding the generated display image information to the display image information storage area provided in the transmission data holding unit 113 (step S1403).

The transmission data generating unit 112 then calculates the X-Y coordinates which express the display position of the cursor design (step S1404).

The transmission data generating unit 112 then generates hot spot information based on the calculated X-Y coordinates and the attribute established in the tag storage area, and adds it to the link information storage area provided in the transmission data holding unit 113 (step S1405).

The transmission data generating unit 112 then resets the link flag in the work area, and deletes the character string in the tag storage area and the character-sequence storage area (step S1406).

The transmission data generating unit 112 fetches an audio information file and converts the audio information contained in the file into information of a predetermined format which it stores in the audio information storage area (step S1407).

The transmission data generating unit 112 operates in accordance with the read tag (step S1408).

Structure of the Data Receiving Apparatus 150

The following is an explanation of the components of the data receiving apparatus 150, with reference to FIGS. 16 to 20.

Structure of the Separating Unit 151

The separating unit 151 includes a read buffer 161 for reading the identification number allotted to transmission data. The read buffer 161 has storage areas for temporarily holding the display image information (including audio information) included in one transmission file and the link information included in one transmission file.

The separating unit 151 separates display image information (including audio information) and link information from the received transmission data, and stores the separated display image information and link information in the corresponding storage areas of the read buffer 161. The identification number assigned to the display image information stored in the storage area is read by recognizing the image written in the predetermined part of the non-displayed area of the display image information. The identification number assigned to the link information is read in the same manner as when reading an identification number assigned to a conventional digital data file. If the read identification number is the identification number designated by the control unit 155, the display image information (including audio information) or the link information held by the read buffer 161 is stored in the corresponding storage area in the received data holding unit 152. At this point, any audio information which is present is stored by the separating unit 151 in a corresponding storage area provided in the received data holding unit 152 at the same time as the display image information is stored, so that the audio information is gradually accumulated while the display image information with the identification number designated by the control unit 155 is repetitively transmitted. By doing so, audio information which is transmitted across a plurality of frames can be separated from the transmission data.

If the read identification number is not the identification number designated by the control unit 155, the display image information (including audio information) or its link information held by the read buffer 161 is discarded. The reading of new display image information (including audio information) and link information is continued, and the above procedure is repeated until the identification number designated by the control unit 155 is detected.

Structures of the Received Data Holding Unit 152, the Reproducing Unit 153, and the Display Unit 154

The received data holding unit 152 stores display image information (including audio information) and link information separated by the separating unit 151 linked with their assigned identification number. The storage area for storing the display image information can be achieved by RAM or a hard disk device capable of storing one static image which is the size of the display screen.

The reproducing unit 153 reproduces the display image information stored in the received image holding unit 152 along with the graphics information (described later) inputted from the control unit 155, in accordance with an indication which it receives from the control unit 155. The reproducing unit 153 outputs the reproduced image to the display unit 154. The reproducing unit 153 also reproduces the stored audio information in synchronization with the reproduction display image information and outputs the reproduced audio to the audio output unit 157.

The display unit 154 can be realized by a television monitor which displays images according to NTSC (National Television System Committee) standard, and is used to display the display image and cursor design on its screen, in accordance with the input from the reproducing unit 153.

Structure of the Control Unit 155

The control unit 155 sets an initial value in the register storing a variable (described later), and instructs the separating unit 151 to fetch the display image information (including audio information) and link information of a page specified by this initial value, which as one example can be the identification number "0001".

The control unit 155 instructs the reproducing unit 153 to reproduce the display image information (including audio information), every time new display image information (including audio information) is stored in the received data holding unit 152. Every time new link information is stored in the received data holding unit 152, the control unit 155 interprets the link information and generates a cursor design correspondence table in which cursor designs (described later) are generated for each cursor display position. These cursor designs are expressed by cursor information which is held inside the control unit 155. The control unit 155 outputs design information expressing a cursor design together with the cursor position to the reproducing unit 153, as well as indicating the reproduction of the cursor design.

FIG. 16 shows an example of the cursor design correspondence table which the control unit 155 generates to control the display position of the cursor design.

The cursor design correspondence table shows the correspondence between each cursor display position which is expressed in the hot spot information in the link information stored in the received data holding unit 152 and the cursor number for the cursor design to be displayed at each cursor display position. The control unit 155 assigns cursor numbers to each cursor display position in the link information in order of lowest Y coordinate and then lowest X coordinate, as one example, and writes each display position into the item with corresponding cursor number in the cursor design correspondence table.

FIG. 17 shows an example of the design information stored by the control unit 155. As shown in FIG. 17, the control unit 155 stores cursor information which expresses a cursor design for each cursor number when the number is selected (referred to as the "selection state") and a cursor design for each number when the number is not selected (referred to as the "non-selection state").

On receiving an interrupt from the signal receiving unit 156, the control unit 155 interprets the type of input signal stored in the signal receiving unit 156, selects the design information of the corresponding cursor design, and outputs the cursor information to the reproducing unit 153. Following this, the control unit 155 controls the handling of the received data by the separating unit 151, in accordance with the cursor whose selection has been confirmed.

Display Control Procedure for the Received Data

The following is a detailed explanation of the display control procedure by the control unit 155 for a set of received data, a set of received data referring to display image information (including audio information) and link information which have been stored in corresponding storage areas in the received data holding unit 152 by the separating unit 151 and which have the same identification number.

The control unit 155 sets a predetermined value, such as "1", into the variable "P-Index" which expresses the identification number of the received data to be displayed. The control unit 155 then sets a predetermined value, such as "1", into the variable "Cur-Pos" showing the cursor number which is in the selection state. Following this, the control unit 155 instructs the separating unit 151 to obtain the transmission data indicated by the variable "P-Index". The control unit 155 then interprets the link information in the received data which is received in accordance with this instruction and is stored in the received data holding unit 152, and outputs the cursor information for each cursor, the cursor indicated by the variable Cur-Pos being in the selection state, together with the display position to the reproducing unit 153. Here, when an interrupt from the signal receiving unit 156 occurs, the control unit 155 interprets the control signal stored in the signal receiving unit 156. First, the control unit 155 checks whether the input signal was "Up", in which case the control unit 155 decreases the value of variable Cur-Pos by 1. If not, the control unit 155 checks whether the input signal was "Down", in which case the control unit 155 increases the value of variable Cur-Pos by 1. If not, the control unit 155 checks whether the input signal was "Enter", in which case the control unit 155 finds the coordinates of the display position from the cursor number given by the variable Cur-Pos, and obtains the identification number of the file which is the link destination file written in the hot spot information for these coordinates. The control unit 155 then sets this identification number in the variable P-Index, and instructs the separating unit 151 to obtain the transmission data shown by the variable P-Index.

Structure of the Signal Receiving Unit 156 and the Audio Output Unit 157

On receiving an input signal from a remote controller (not-illustrated) or the like, the signal receiving unit 156 creates an interrupt for the control unit 155 in accordance with the received input signal, as well as holding the received input signal.

The audio output unit 157 can be realized by a speaker or the like, and is used to output the reproduced audio information as audio.

Example of a Display Image

Figure 18:
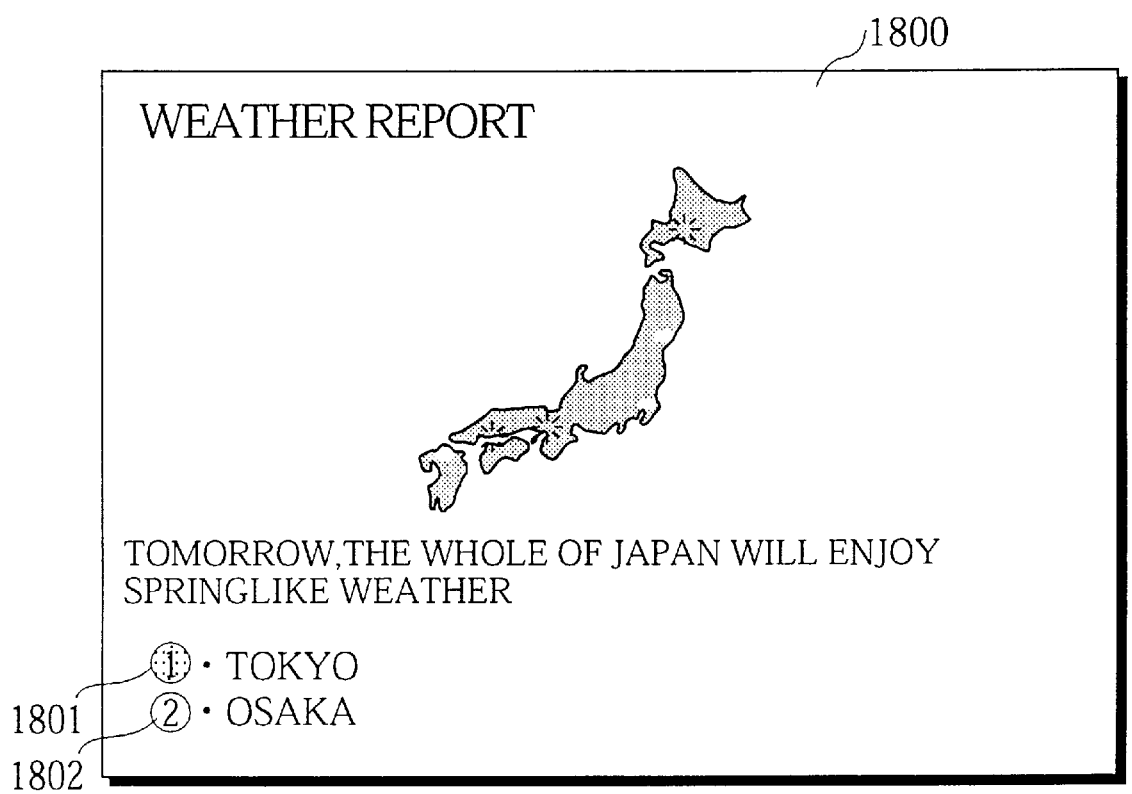
FIG. 18 shows the display image for the initial screen which is displayed by the display unit based on the transmission data shown in FIGS. 8A to 8C.

FIG. 18 shows display image 1800 for the initial screen which is displayed by the display unit 154 based on the transmission data 800 shown in FIGS. 8A to 8C.

As shown in FIG. 18, the display image 1800 has the cursor design 1801 corresponding to cursor number "1" displayed at a display position (100,600) indicated by the display image information 801, in accordance with the hot spot information given on line 812 of the link information 803. It should be noted here that the cursor information which represents the selection state has been selected for cursor design 1801 in accordance with the initial value of the variable Cur-Pos which is held by the control unit 155.

In the same way, the cursor design 1801 corresponding to cursor number "2" is displayed at a display position (100, 700), in accordance with the hot spot information given on line 813 of the link information 803. It should be noted here that the cursor information which represents the non-selection state has been selected for cursor design 1802 since its cursor number "2" does not coincide with the initial value of the variable Cur-Pos.

Here, since the transmission data 800 includes audio information 802 in addition to the display image information 801, an audio commentary is outputted by the audio output unit 157 when the display image 1800 is displayed on the display unit 154.

Figure 19:
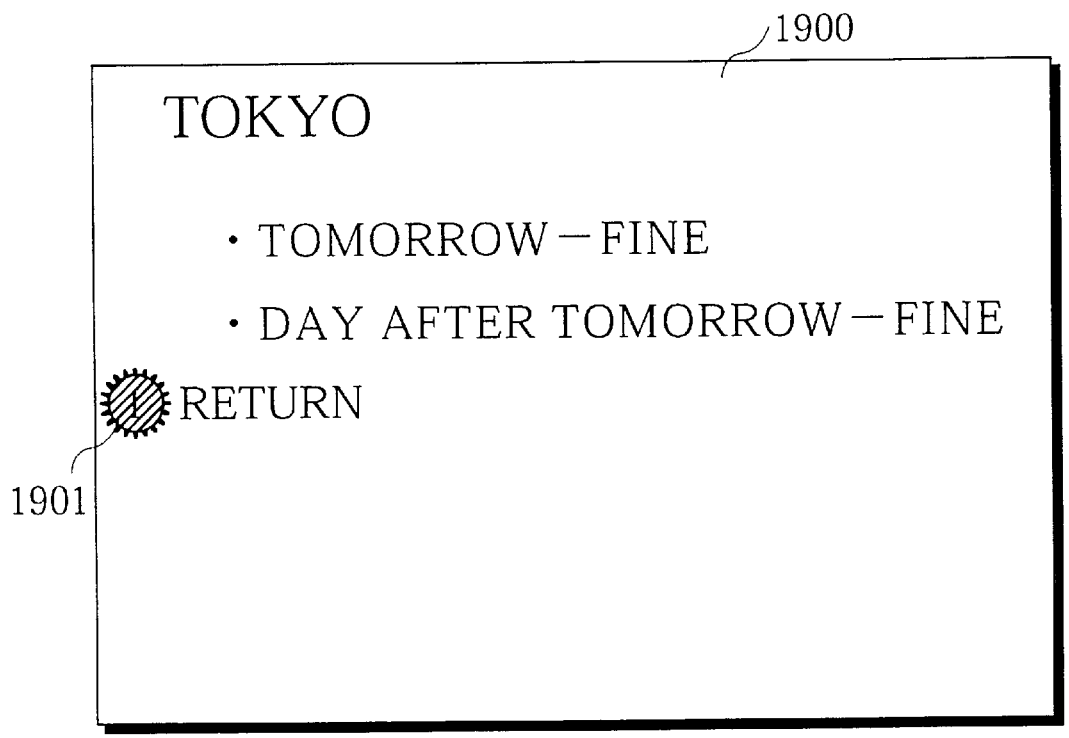
FIG. 19 shows the display image which is the initial screen displayed by the display unit for the transmission data shown in FIGS. 9A and 9B.

FIG. 19 shows the display image 1900 which is the initial screen displayed by the display unit 154 for the transmission data 900 shown in FIGS. 9A and 9B.

As with the display image 1800 in FIG. 18, the display image 1900 has the cursor design 1901 displayed at a display position (050,400) indicated by the display image information 901, in accordance with the hot spot information given on line 912 of the link information 902. Here, the cursor information for the selection state is selected as cursor design 1901.

Figure 20:
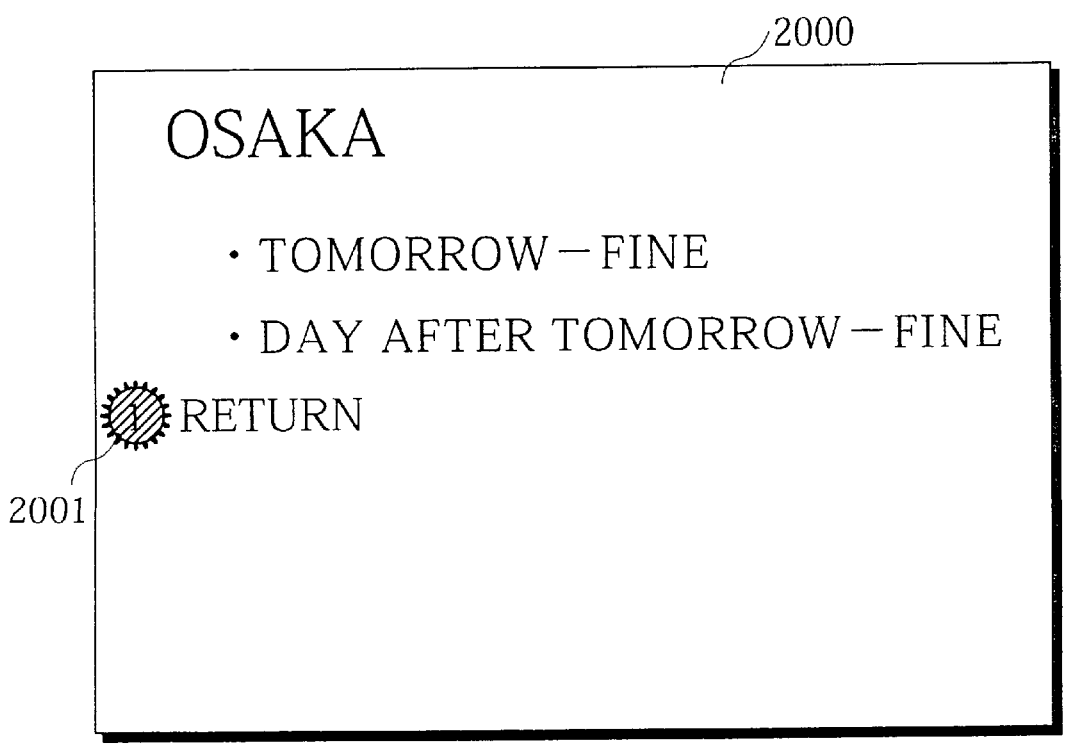
FIG. 20 shows the display image which is the initial screen displayed by the display unit for the transmission data shown in FIG. 10A and 10B.

FIG. 20 shows the display image 2000 which is the initial screen displayed by the display unit 154 for the transmission data 1000 shown in FIG. 10A and 10B.

As before, the display image 2000 has the cursor design 2001, which corresponds to cursor number "1" and which shows the selection state, displayed at a display position (050,400) indicated by the display image information 1001, in accordance with the hot spot information given on line 1912 of the link information 1002.

Specific Example of the Procedure of the Control Unit 155

The following is an explanation of a specific example of the procedure executed by the control unit 155 when displaying the display image 1800 on the display unit 154 based on the transmission data 800.

The control unit 155 first sets the initial value of the variable P-Index at "0001" and the initial value of the variable Cur-Pos at "1". Next, the control unit 155 instructs the separating unit 151 to obtain the display image information 801 (including the audio information 802) and the link information 803 which have the identification number "0001" set in the variable P-Index. The control unit 155 then instructs the reproducing unit 153 to reproduce the display image information 801 (including audio information 802) stored in the received data holding unit 152. The reproducing unit 153 reproduces the display image information 801 and outputs it to the display unit 154 and simultaneously reproduces the audio information 802 which it outputs to the audio output unit 157. The control unit 155 interprets the link information 803 stored in the received data holding unit 152, generates a cursor design correspondence table, and outputs design information for each cursor and their display positions to the reproducing unit 153. At this point, the cursor indicated by the variable Cur-Pos, which is to say the first cursor, is displayed in the selection state.

The control unit 155 then waits for an input from the signal receiving unit 156. Here, suppose that a "Down" signal is inputted into the signal receiving unit 156 from an external remote controller. When the input signal is "Down", the control unit 155 increases the value of variable Cur-Pos by "1", making it "2". Next, the cursor information for the selection state is selected as the design for cursor number "2" which is indicated by this updated variable Cur-Pos, and the cursor information for the non-selection state is selected as the design for cursor number "1" which was formerly indicated by the variable Cur-Pos, with these sets of cursor information being outputted to the reproducing unit 153.

The control unit 155 waits for an interrupt from the signal receiving unit 156, with the following explanation describing the case when the signal receiving unit 156 stores an input signal for a pressing of the "Enter" key after generating the interrupt. If the input signal is "Enter", the control unit 155 reads the X-Y coordinates (100,700) corresponding to cursor number "2" which is indicated by the variable Cur-Pos from the cursor design correspondence table. Next, the control unit 155 reads the identification number of the link destination file of the hot spot information on line 813, based on these X-Y coordinates (100,700), and obtains the identification number "0003". Next, this identification number "0003" is set as the value of the variable P-Index. Following this, the control unit 155 instructs the separating unit 151 to obtain the display image information 1001 and the link information 1002 which have the identification number indicated by this variable P-Index. The control unit 155 then resets the variable Cur-Pos to "1".

By repeating the processing described above, the display image 2000 shown in FIG. 20 can be displayed on the display unit 154. Here, if an interrupt occurs when the value of the variable Cur-Pos is "1", and an input signal for "Enter" is being stored by the signal receiving unit 156 when the control unit 155 refers to the signal receiving unit 156, the control unit 155 will have the display image 1900 shown in FIG. 19 displayed on the display unit 154, as described above.

Procedure for Display Control

Figure 21:
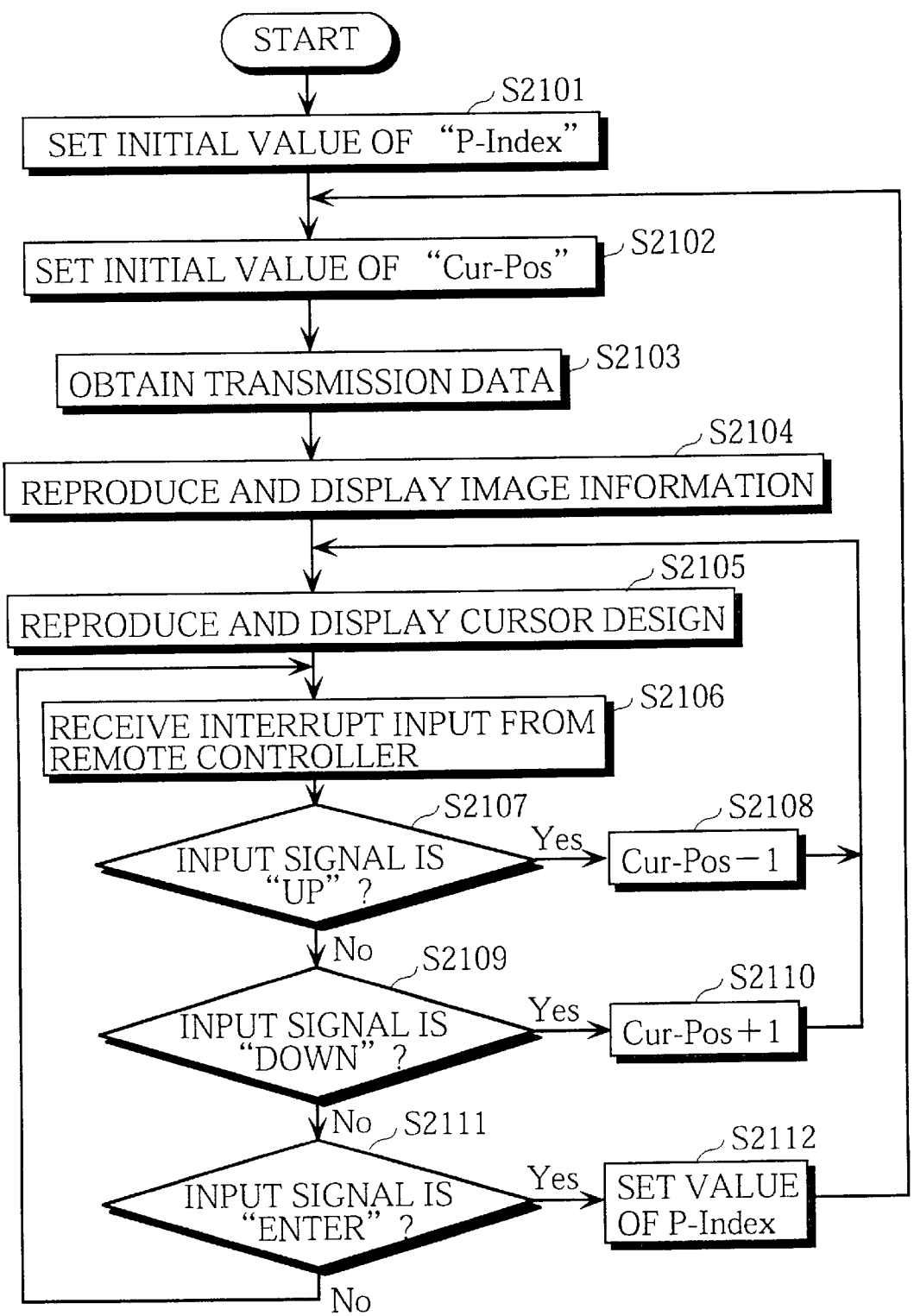
FIG. 21 is a flowchart showing an example procedure for display control which is performed by the control unit in the first embodiment.

FIG. 21 is a flowchart showing an example procedure for display control which is performed by the control unit 155.

The control unit 155 first sets the initial value of the variable P-Index which indicates the identification number of the transmission data to be obtained (step S2101).

The control unit 155 then sets the initial value of the variable Cur-Pos which indicates the cursor number of the cursor in the selection state for the start of display of each display screen (step S2102).

The control unit 155 then instructs the separating unit 151 to obtain the transmission data which has the identification number indicated by the variable P-Index. The separating unit 151 then separates the display image information and link information in accordance with the indication from the control unit 155, and stores the display image information and link information with their identification number in the received data holding unit 152 (step S2103).

On being instructed by the control unit 155, the reproducing unit 153 reproduces the display image information in the received data holding unit 152 and outputs it to the display unit 154. When there is audio information which is related to the display image information, the reproducing unit 153 reproduces this audio information and outputs it to the audio output unit 157 (S2104).

The control unit 155 interprets the link information in the received data holding unit 152 and outputs the design information for the cursor designs together with the X-Y coordinates for the display positions of the cursors, as well as an instruction to display the design information to the reproducing unit 153. The reproducing unit 153 reproduces the design information inputted from the control unit 155 and outputs it to the display unit 154 (step S2105). By doing so, one display image is displayed by the display unit 154.

The control unit 155 waits for an interrupt from the signal receiving unit 156 (step S2106), and on receiving an interrupt, checks whether the input signal held by the signal receiving unit 156 is "Up" (step S2107).

If the input signal is "Up", the control unit 155 subtracts "1" from the value of the variable Cur-Pos (step S2108). If not, the control unit 155 checks whether the input signal held by the signal receiving unit 156 is "Down" (step S2109).

If the input signal is "Down", the control unit adds "1" to the value of the variable Cur-Pos (step S2110). If not, the control unit 155 checks whether the input signal held by the signal receiving unit 156 is "Enter" (step S2111).

If the input signal in "Enter", the control unit 155 uses the cursor number shown by the variable Cur-Pos to reference the cursor design correspondence table and so finds the cursor display position (X,Y) which it then uses to find the value of the identification number of the link destination file in the hot spot information. The control unit 155 then sets this identification number as the value of the variable P-Index. After this, the processing returns to S2102.

If the input signal is not "Enter", the processing returns to S2106.

As described above, in the present embodiment the display image information, which conventionally would have had to have been generated by the data receiving apparatus 150 while the data receiving apparatus 150 is interpreting the control information, is generated and transmitted by the data transmitting apparatus 110, which reduces the load of each data receiving apparatus 150. Also, when compared with the large number and variety of display control processes for display character strings which were conventionally written into the control information, the link information of the present embodiment contains a smaller number and less variety of control processes. As a result, simulated bidirectional communication can be easily achieved by the data receiving apparatuses 150 using this link information.

The present embodiment describes the case when in order to display WWW home pages on the Internet, the data communication system 100 uses a one-to-many TV broadcast to perform simulated bidirectional communication, so that when compared to the case when home pages are displayed by a browser on a personal computer, the display of the user's desired pages on the display unit 154 can be performed at a high speed which is unaffected by congestion. Since display image information is sent in a conventional TV format, the display of full color, high-resolution images can easily be achieved by the display unit 154. Also, while the display of display images generated by a browser for display on a TV monitor does not make full use of the components, such as the reproduction processing for display images, conventionally provided inside a TV, the present embodiment can achieve simulated bidirectional communication which makes full use of circuitry, such as memory and decoders, conventionally provided inside a TV set.

In the present embodiment, while the information to be obtained has been described as HTML documents which are used on the WWW together with compressed image information in GIF format and audio information in AU format, information expressed in other formats or languages, such as HyperCards, can be used. In such case, the processing for "<A>" tags refer to a method for conversion for the corresponding format and language. The present embodiment also describes the conversion of an HTML document containing only a limited number of tags, although other HTML tags may also be included.

The present embodiment also describes an example where the control for simulated bidirectional communication performed according to the link information is the switching of the display to another display image, although other processes, such as a process for flashing display on the screen, a process for scrolling the display image, or a process for activating a device such as a fax, telephone, or video recorder connected to the data receiving apparatus, may be performed in addition to simulated bidirectional communication.

The data communication system 100 is also described as having identification numbers of files written into the link information by the transmission data generating unit 112, although this process need not to be performed. As one alternative, the original file name may be written into the link information as the file identification number. When doing so, the file name can be attached to the display image information (including audio information) and link information in each set of transmission data during transmission, with the data receiving apparatus 150 which receives this information successively obtaining a complete set of link information after being switched on, so that it can then investigate the correspondence between file names and identification numbers.

The data receiving apparatus 150 may also store a complete set of display image information and link information which are repeatedly transmitted by the data transmitting apparatus 110 in the received data holding unit 152.

When the transport stream shown in FIG. 11B is transmitted from the data transmitting apparatus 110, the receiving apparatus 150 may first have the separating unit 151 separate and obtain the PMT, before reading the PMT to find the PID of the display image information to be obtained and having the display image information separated and obtained from the transport stream with the read PID as a filter condition. It may also read the PID of the private stream including the link information from the PMT, and then separate and obtain the link information from the transport stream with the PID and the identification number (table ID extension) as the filter conditions.

The transport stream shown in FIG. 11B was also described as having a video elementary stream made up of I pictures, although the video elementary stream may include B pictures and P Pictures. The display image information was also described as being encoded according to MPEG2 standard, although it may alternatively be encoded under another standard, such as MPEG1, JPEG, or GIF. Finally, the display image information and audio information were described as being transmitted as a video elementary stream and an audio elementary stream, although they may be multiplexed as private sections in the same way as the link information.

Second Embodiment

Figure 22:
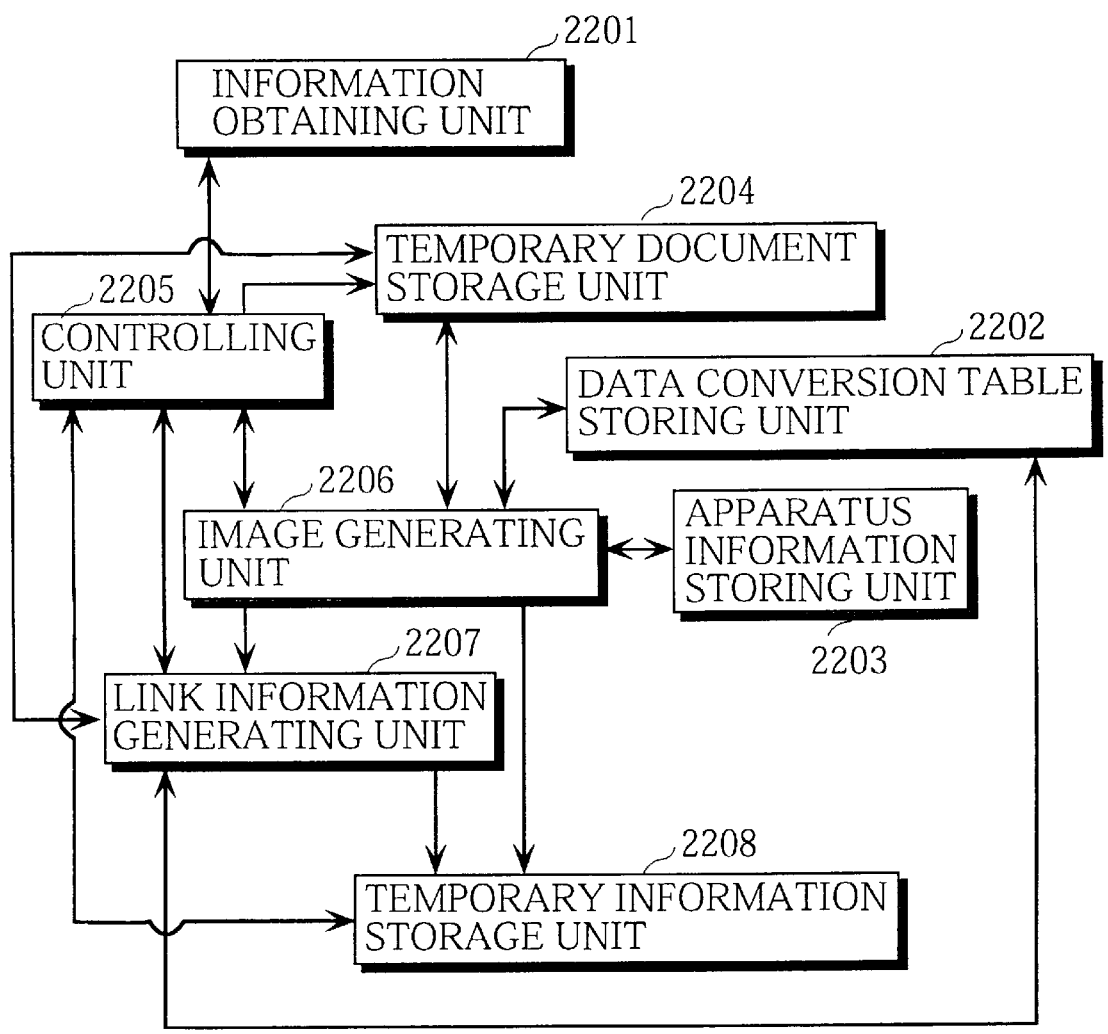
FIG. 22 shows the construction of the data conversion apparatus in the second embodiment of the present invention.

FIG. 22 shows the construction of the data conversion apparatus in the second embodiment of the present invention used in a data communication system 100. Note that the construction of the data communication system 100 is the same as that described in the first embodiment.

The data conversion apparatus includes information obtaining unit 2201, data conversion table storing unit 2202, apparatus information storing unit 2203, temporary document storage unit 2204, controlling unit 2205, image generating unit 2206, link information generating unit 2207, and temporary information storage unit 2208. The data conversion apparatus of the present embodiment is equal to information obtaining unit 111 and transmission data generating unit 112 of the first embodiment. Information obtaining unit 2201 is connected to an external database, and controlling unit 2205 is connected to transmission data holding unit 1103.

Figures 24, 25:
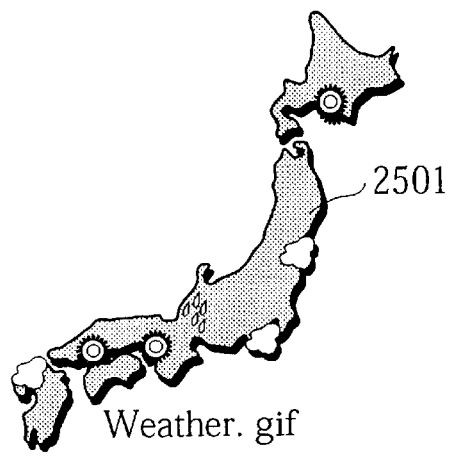
FIG. 24 shows an example document stored in the information obtaining unit in the second embodiment.
FIG. 25 shows an example image stored in the information obtaining unit in the second embodiment.

Information obtaining unit 2201 obtains multimedia data from the external database and stores the obtained data in an inside buffer. The multimedia data, for example, includes HTML documents 2301 and 2401 and image 2501 as shown in FIG. 25, where image 2501 is compressed under GIF format.

Figure 26:
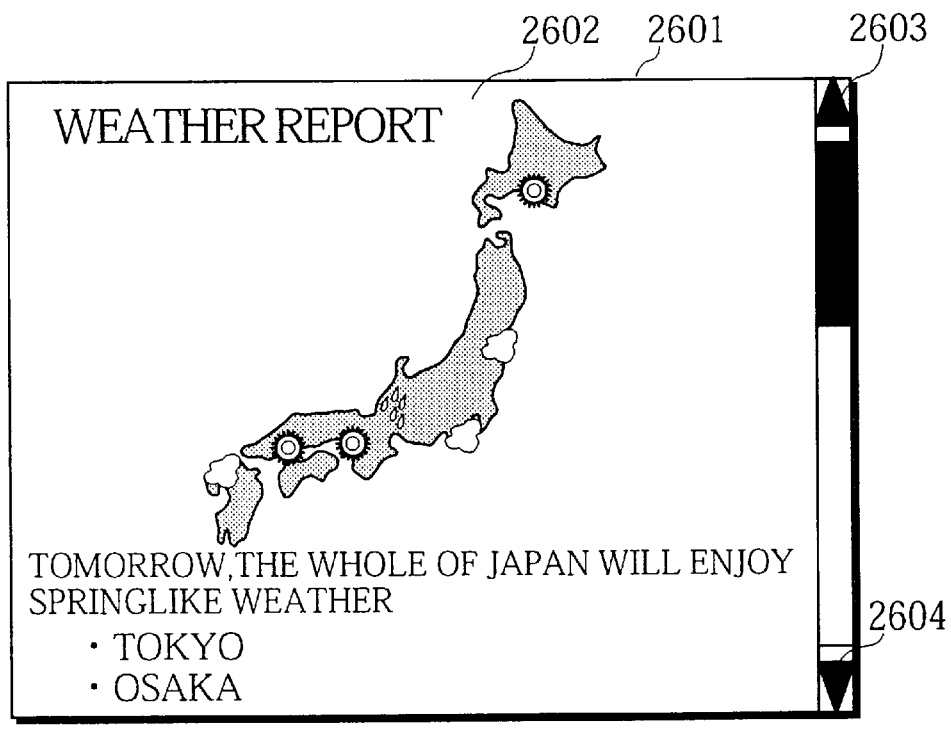
FIG. 26 shows the image of FIG. 23 displayed on the display screen by using a conventional www browser.
Figure 27:
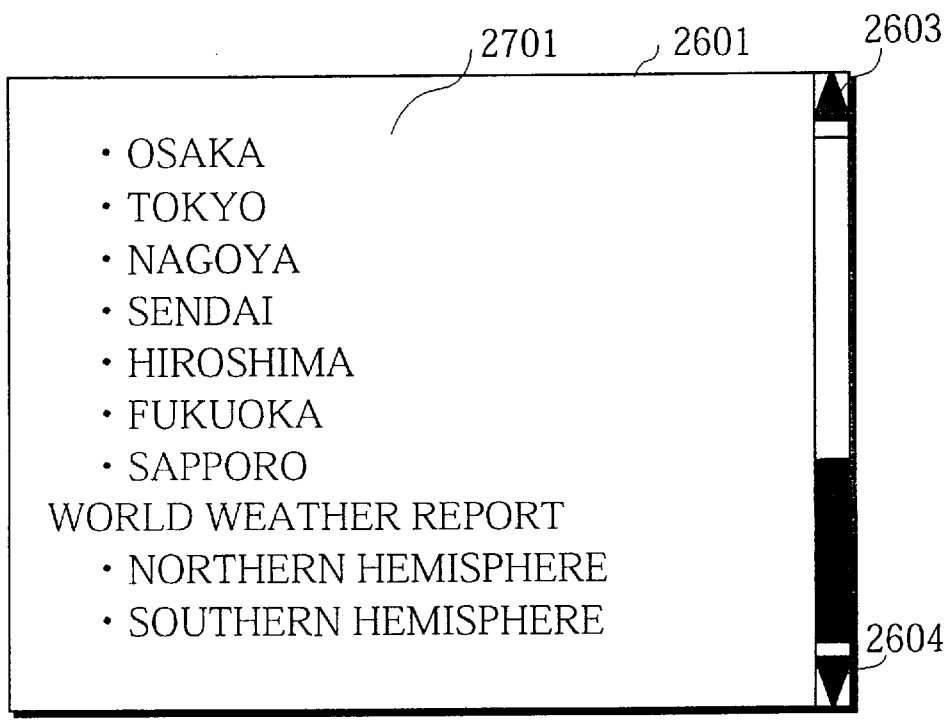
FIG. 27 shows the image of FIG. 23 displayed on the display screen by using a conventional www browser.

HTML documents 2301 and 2401 and image 2501 have been described in the first embodiment, and they are omitted here. FIGS. 26 and 27 show HTML document 2301 and image 2501 displayed on display screen 2601 having a resolution of 640×480 dots. Document 2301 is displayed as an image over two screens, namely consecutive display images 2602 and 2701. The two display images can be scrolled in the vertical direction by operating scroll buttons 2603 and 2604 which are respectively displayed on the upper-right and lower-right corners of the screen.

Data conversion table storing unit 2202 has a data conversion table for converting a multimedia document, which has been read from information obtaining unit 2201, into the data format suitable for transmission data holding unit 113. The data conversion table includes a tag table (not shown in the drawings), font table 2801 as shown in FIG. 28, and link information conversion table 2901 as shown in FIG. 29.

The tag table stores information used for interpret the tags written in HTML document 2301 as shown in FIG. 23 which is written according to HTML standard. The tag table has been described in the first embodiment with reference to FIGS. 2 and 4.

Font table 2801 includes the x-y coordinates of starting point 2803 of a character string which corresponds to tag 2802 in HTML document 2301. Font table 2801 also includes font size 2804. The x-y coordinates and font size 2804 are represented by dots (pixels).

Note that for conventional browsers, tag <CENTER> indicates that texts or images should be centered, in the present embodiment, it specifies that the x coordinate of the starting point is "20" (20th dot).

Link information conversion table 2901 includes conversion information 2902 and 2903 for generating the link information. Conversion information 2902 indicates that "file name" in HTML document 2301 should be converted to "Index file name." It should be noted that if a file is displayed over two or more screens, that is, if a file is divided into two or more files corresponding to the screens, the second file name and after are allotted serial numbers.

Conversion information 2903 indicates that tag <A> including "file name" as a link destination should be converted to "Hotspot(M file name)," where "M" is a number corresponding to the number of conversions.

Apparatus information storing unit 2203 stores the number of pixels in displaying unit 154 of receiving apparatus 150 in data communication system 100. More specifically, apparatus information storing unit 2203 stores XMAX which is the number of pixels in the horizontal direction and YMAX in the vertical direction. The numbers are, for example, X=853 and YMAX=480.

Temporary document storage unit 2204 stores a document among the documents stored in information obtaining unit 2201 and an image. Temporary document storage unit 2204 stores, for example, HTML document 2301 as shown in FIG. 23 and image 2501 as shown in FIG. 25.

Controlling unit 2205, on receiving from an external unit an instruction for generating reproduction information, reads a document from information obtaining unit 2201, stores the document in temporary document storage unit 2204, and activates image generating unit 2206 and link information generating unit 2207. Controlling unit 2205, on receiving from image generating unit 2206 an instruction for writing data into transmission data holding unit 113, reads an image from the image storage area of temporary information storage unit 2208, writes the image into display image storing unit 123, reads a piece of link information from the link information storage area, and writes the piece of link information into link information storing unit 125. In this process, the same identification number is given to both the image and the piece of link information so that both are identified as a pair. Controlling unit 2205, after completing the writing, initializes temporary information storage unit 2208 and notifies image generating unit 2206 and link information generating unit 2207 of the end of writing.

Controlling unit 2205, on receiving an instruction for storing an image specified by image generating unit 2206 into temporary document storage unit 2204, reads the specified image and stores the image into temporary document storage unit 2204.

Image generating unit 2206, when activated by controlling unit 2205, reads XMAX and YMAX from apparatus information storing unit 2203, allocates an image storage area in temporary information storage unit 2208 for storing an image with the size of a screen, then allocates a link information storage area related to this image storage area. Image generating unit 2206, on receiving a notification of the end of writing from controlling unit 2205, allocates an image storage area and a link information storage area in a similar way.

Image generating unit 2206, after allocating the image storage area in temporary information storage unit 2208, reads a tag table (not shown in the drawings) and font table 2801 from data conversion table storing unit 2202, and converts character strings and images of the document stored in temporary document storage unit 2204 into an image to be displayed. The process of the conversion has been described in the first embodiment in relation to transmission data generating unit 112.

Image generating unit 2206 calculates the x-y coordinates of the lower-right position of the converted image, then judges, through the calculations shown below, whether the screen displaying the converted image has a blank. If image generating unit 2206 judges that the screen has a blank, image generating unit 2206 stores the converted image into the image storage area in temporary information storage unit 2208. Note that a term "blank" indicates a part of the image storage area where no data has been stored, where the image storage area corresponds to the display screen. That means data can be written into the blank.

The calculations are performed as follows. Image generating unit 2206 substitutes "0" for each of variables X, Y, Xmax, and Ymax. "Xmax" and "Ymax" are respectively variables representing the maximum x coordinate value and the maximum y coordinate value in the coordinate system (the right end position and the lower end position) in an image currently stored in the image storage area. Note that the origin (0,0) of the coordinate system is the upper-left position of the display screen, and that x-axis extends in the horizontal direction, y-axis in the vertical direction.

Image generating unit 2206 converts the character strings specified by the tags into images based on font table 2801, and calculates the size of the images (Xs,Ys). The size of character string "WEATHER REPORT" 2302 as shown in FIG. 23, for example, is, according to this calculation, Xs=10+80×4=330, Ys=10+80=90. Similarly, the size of character string "TOMORROW, THE WHOLE OF JAPAN WILL ENJOY SPRINGLIKE WEATHER" 2303 will be Xs=10+30×20=610, Ys=60.

If a result of "Ys" plus "Y" is equal to or smaller than YMAX, image generating unit 2206 writes the image in the image storage area at (X,Y) position. Image generating unit 2206 compares Xmax with the sum of X and Xs. If Xmax is smaller than the sum of X and Xs, image generating unit 2206 substitutes the sum of X and Xs for Xmax, substitutes the sum of Y and Ys for Y, and converts the next character string or an image into an image to be displayed. If Xmax is equal to or greater than the sum of X and Xs, image generating unit 2206 substitutes the sum of Y and Ys for Y and converts the next character string or an image into an image to be displayed.

If a result of "Ys" plus "Y" is greater than YMAX, image generating unit 2206 substitutes Ymax for Y, substitutes Xmax for X, then compares XMAX with the sum of X and Xs. If XMAX is equal to or greater than the sum of X and Xs, image generating unit 2206 writes the converted image in the image storage area at (X,Y) position. Note that the (X,Y) position is at the right-hand side of the display screen. Image generating unit 2206 then judges whether XMAX and the sum of X and Xs match. If they match, image generating unit 2206 substitutes the sum of Y and Ys for each of Ymax and Y, and converts the next character string or an image into an image to be displayed. If not match, image generating unit 2206 substitutes the sum of X and Xs for Xmax, substitutes the sum of Y and Ys for Y, and converts the next character string or an image into an image to be displayed.

If XMAX is smaller than the sum of X and Xs, image generating unit 2206 judges that the screen has no blank, and instructs controlling unit 2205 to write a pair of the image stored in temporary information storage unit 2208 and a piece of link information into transmission data holding unit 113 (see FIG. 1).

Image generating unit 2206, on reading tag <IMG> 2304, instructs controlling unit 2205 to store image file "Weather.gif" in temporary document storage unit 2204.

Image generating unit 2206, on reading tag <A> 2305 from temporary document storage unit 2204, notifies link information generating unit 2207 of the contents (name of link target file). Image generating unit 2206, on receiving a value of counter M from link information generating unit 2207, converts the value of counter M into an image and writes the image of the value at the front of the converted image of the character string. Note that link information generating unit 2207 has counter M and counter N for indicating respectively a serial number of a hot spot and a serial number of a file (screen).

Link information generating unit 2207, when activated by controlling unit 2205, reads a file name of a file stored in temporary document storage unit 2204, such as "Report.html," by referring to link information conversion table 2901 of data conversion table storing unit 2202. Link information generating unit 2207 then converts the file name, as shown in FIG. 29, to "index(Report.html)," stores the converted file name into the link information storage area in temporary information storage unit 2208, and sets counter N to "0." After this, link information generating unit 2207 adds "1" to counter N each time link information generating unit 2207 receives the notification of the end of writing. On the following cycles when counter N is not "0," link information generating unit 2207 converts the file name to "index(ReportN.html)," which includes the value of counter N in the file name, and stores the converted file name into the link information storage area in temporary information storage unit 2208

Link information generating unit 2207 sets counter M to "1" when link information generating unit 2207 sets counter N to "0," then increments the value of counter M every time the value of counter N is incremented. Link information generating unit 2207, on receiving the contents of tag <A> 2305 and the like from image generating unit 2206, sends the value of counter M to image generating unit 2206, generates a piece of link information according to conversion information 2903 in link information conversion table 2901, stores the generated piece of link information in the link information storage area in temporary information storage unit 2208, and increments the value of counter M. After this, the value of counter M is inserted at the front of the file name in the piece of link information.

Figure 30:
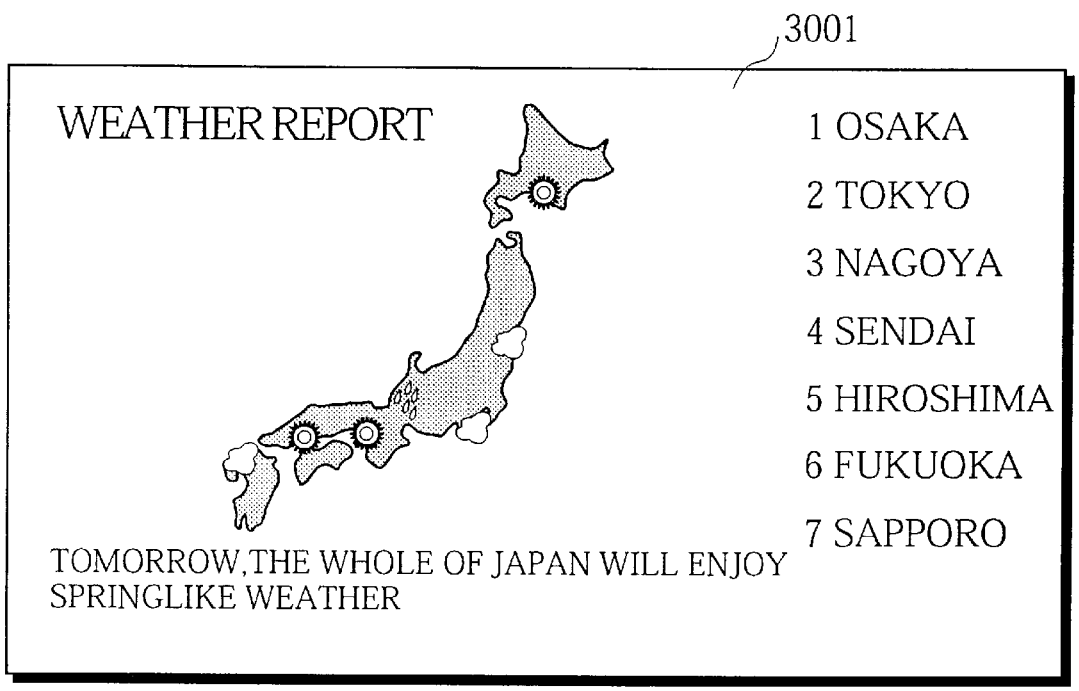
FIG. 30 shows examples of image and link information having been converted and stored in the temporary information storage unit in the second embodiment.

Temporary information storage unit 2208 temporarily stores the image generated by image generating unit 2206 and the piece of link information generated by link information generating unit 2207. FIG. 30 shows image 3001 and link information 3002 of the first display screen generated from HTML document 2301 as shown in FIG. 23. FIG. 31 shows image 3101 and link information 3102 of the second display screen generated from HTML document 2301 as shown in FIG. 23.

Now, the operation of the present embodiment is described with reference to the flowchart of FIG. 32.

When controlling unit 2205 receives an instruction for generating an image from an external element, image generating unit 2206 allocates an image storage area in temporary information storage unit 2208 for storing an image with the size of a screen (S3202). Image generating unit 2206 then substitutes "0" for each of variables X, Y, Xmax, and Ymax, and reads XMAX which is the number of pixels in the horizontal direction and YMAX being the number of pixels in the vertical direction from apparatus information storing unit 2203 (S3204).

It is judged whether temporary document storage unit 2204 stores an HTML document to be analyzed (S3206). If judged that it stores, link information generating unit 2207 and image generating unit 3302 analyzes the HTML document and generates an image and a piece of link information (S3208). If judged that it does not store at S3206, controlling unit 2205 reads the image and the piece of link information from temporary information storage unit 2208, writes the pair of the image and the piece of link information into transmission data holding unit 113, and ends processing.

Image generating unit 2206 substitutes the lengths of the generated image in the directions of X and Y respectively for Xs and Ys (S3210). Image generating unit 2206 makes a judgement on whether "YMAX<Y+Ys" is satisfied (S3212). If judged as not, image generating unit 2206 places the generated image at (X,Y) position (S3214). That is, the image in the image storage area is written as it is without moving to the right-hand side. It is judged whether "Xmax<X+Xs" is satisfied (S3216). If judged as satisfied, image generating unit 2206 substitutes the sum of X and Xs for Xmax (S3218), substitutes the sum of Y and Ys for Y (S3220), and returns to S3206. If judged as not satisfied at S3216, control goes to S3220.

If judged as satisfied at S3212, image generating unit 2206 substitutes Ymax for Y, substitutes Xmax for X (S3222), then judges whether "XMAX<X+Xs" is satisfied (S3224). If judged as satisfied, image generating unit 2206 judges that the screen has no blank, and controlling unit 2205 writes the pair of the stored image and the piece of link information into transmission data holding unit 113. Control then returns to S3202. If judged as not at S3224, image generating unit 2206 writes the converted image in the image storage area at (X,Y) position, namely on the right-hand side of the display screen (S3226).

Image generating unit 2206 then judges whether "XMAX=X+Xs" is satisfied (S3228). If satisfied, image generating unit 2206 substitutes the sum of Y and Ys for Ymax (S3230) and goes to S3220. If judged as not at S3228, control goes to S3218.

Third Embodiment

Figure 33:
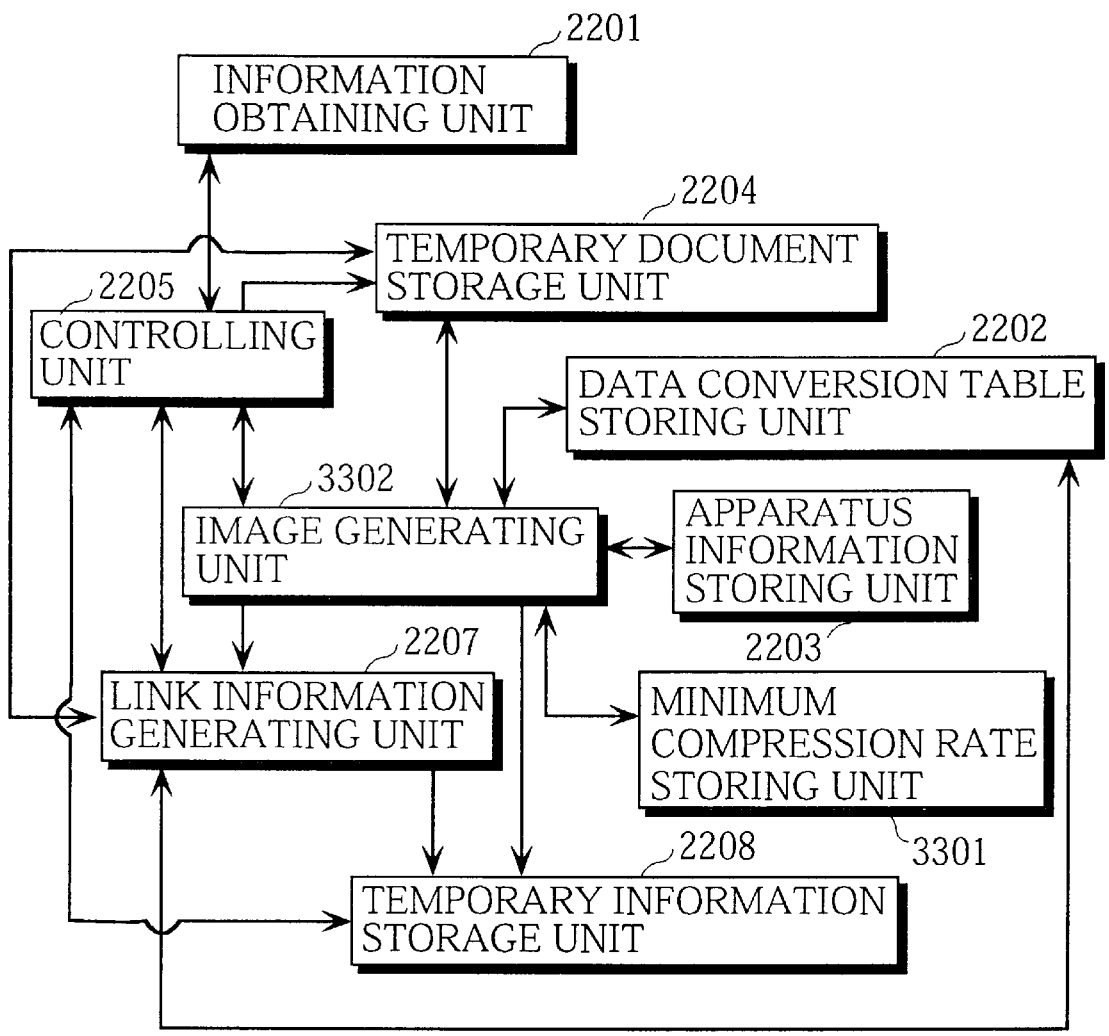
FIG. 33 shows the construction of the data conversion apparatus in the third embodiment of the present invention.

FIG. 33 shows the construction of the data conversion apparatus in the third embodiment of the present invention used in a data communication system 100. The data conversion apparatus additionally includes minimum compression rate storing unit 3301. Furthermore, image generating unit 3302 of this data conversion apparatus additionally has an image reduction function. The following is a description of such features of the present embodiment.

Minimum compression rate storing unit 3301 stores the minimum compression rate for the images in the multimedia data held by information obtaining unit 2201, where the compression rate represents a ratio of the size of a compressed image to that of an original image, that is, as the compression rate decreases, the size of the compressed image decreases. Suppose the minimum compression rate is 10% in the present embodiment.

Image file "Weather.gif" has been compressed under the GIF format. FIG. 25 shows image 2501 which is image file "Weather.gif" having been decompressed under a GIF decompression algorithm in the second embodiment. This image is 400 (horizontal)×300 (vertical) pixels in size. Accordingly, it is possible to display this image in the screen of displaying unit 154.

Figure 34:
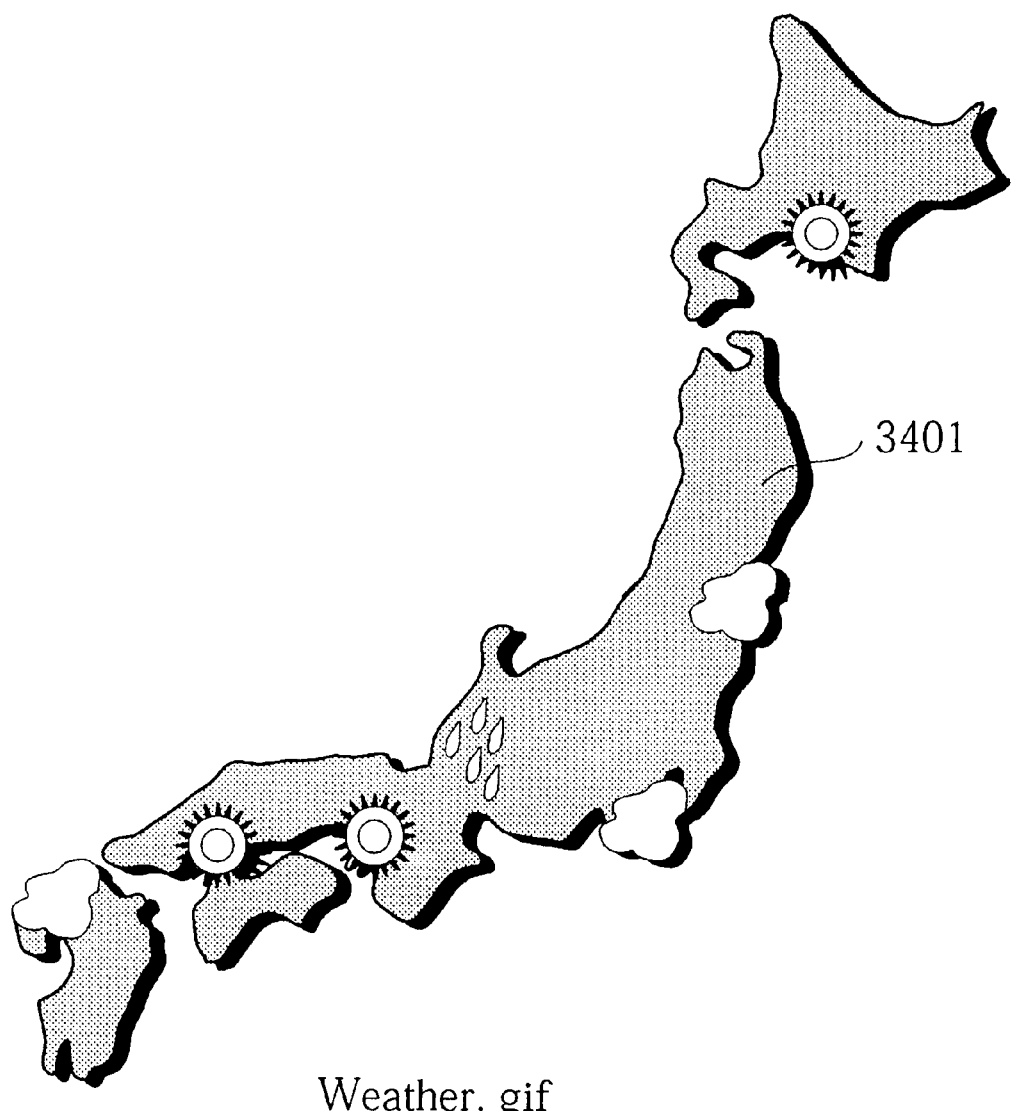
FIG. 34 shows an example image stored in the information obtaining unit in the third embodiment.
Figure 35:
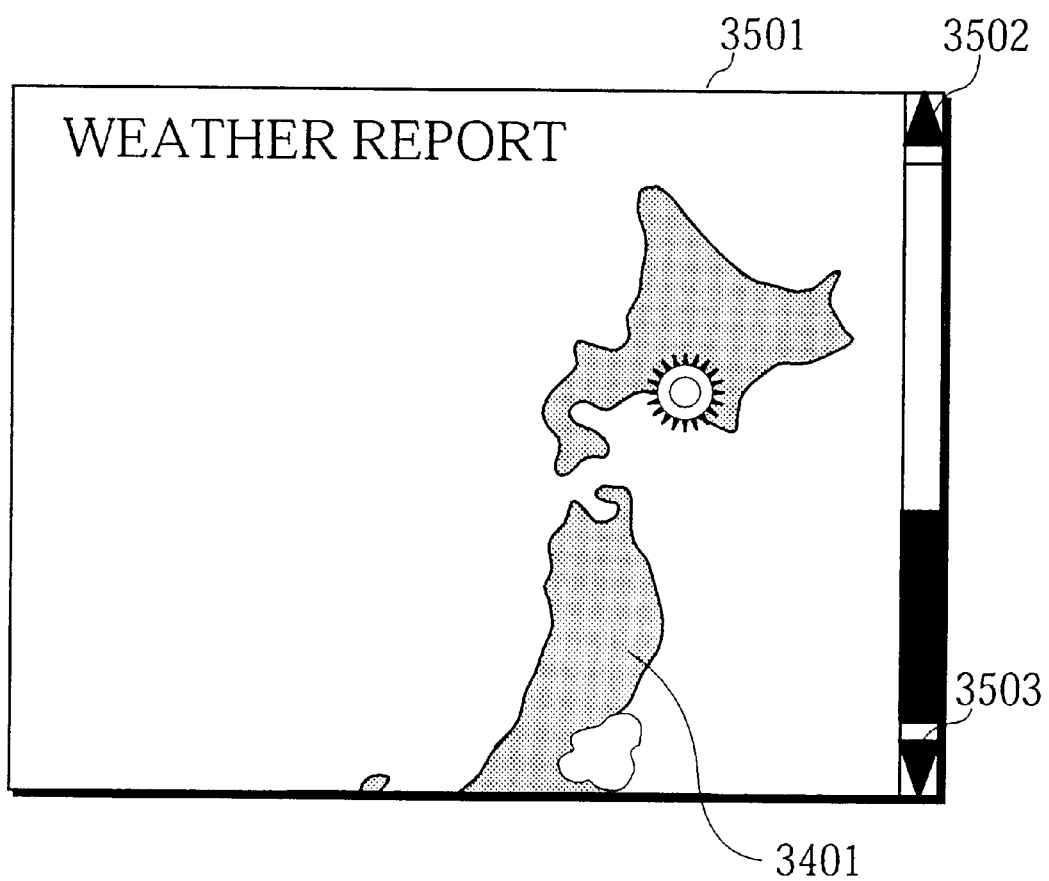
FIG. 35 shows the image of FIG. 34 displayed on the display screen by using a conventional www browser.

FIG. 34 shows image 3401 which is image file "Weather.gif" specified in tag <IMG> in FIG. 23 having been decompressed under a GIF decompression algorithm in the third embodiment. Image 3401 has a size of 600×900 pixels. Conventional browsers may display image 3401 as screen 3501 of 640×480 pixels which only shows a part of image 3401 as shown in FIG. 35. The whole of image 3401 may be seen, for example, on a screen with scroll buttons 3502 and 3503 in a display of a PC.

It is difficult, however, for TV watchers to see the whole of an image if the image is divided since TV screens do not display such scroll buttons.

Image generating unit 3302 judges whether the whole of image 3401 can be displayed on the screen. If judged as not, image generating unit 3302 compresses image 3401 with a compression rate whose value is equivalent to or higher than that of the minimum compression rate so that the whole of image 3401 can be displayed on the screen. Image generating unit 3302 stores the compressed image into the image storage area.

Character string "WEATHER REPORT" 2302 stored in the image storage area has X=0×Y=90 in size. Image generating unit 3302 recognizes the size of image 3401 as Xs=620×Ys=900 by calculation. Image generating unit 3302 judges whether YMAX<Y+Ys is satisfied, where YMAX is 480. In this case, YMAX<Y+Ys is satisfied. Thus, image generating unit 3302 judges that the whole of image 3401 cannot be displayed on the screen.

Image generating unit 3302 calculates compression rate "k" with a formula:

$$k=(YMAX-Y)\times 100/Ys.$$

In the above case, k (480−90)×100/900=43.3. The compression rate value "43.3" is greater than the value of the minimum compression rate, "10." Thus, image generating unit 3302 judges that image 3401 can be compressed with compression rate "43.3." The compression rate is further converted into an integer, in this case, "40."

Figure 36:
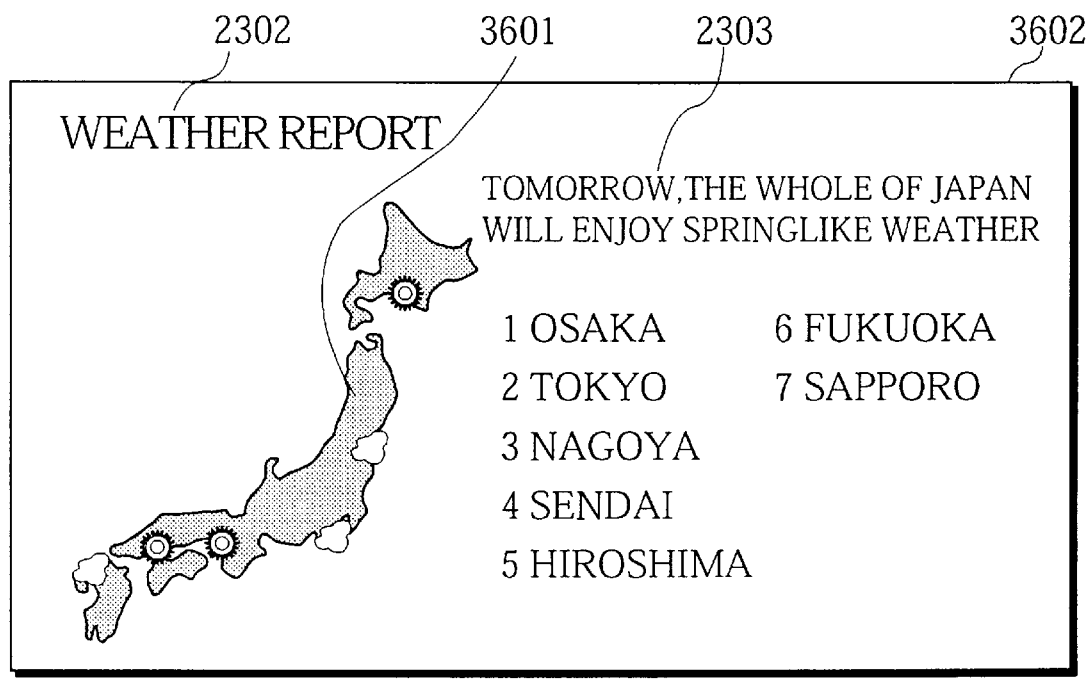
FIG. 36 shows examples of image and link information having been converted and stored in the temporary information storage unit in the third embodiment.

Image 3401 is compressed to image 3601 as shown in FIG. 36 with compression rate "40." For this compression, 3 out of 5 pixels may be reduced from image 3401 in each of horizontal and vertical directions, or the pixel values may be reduced to 40% in average. Image 3601 is stored in image storage area 3602 in temporary information storage unit 2208.

If calculated compression rate k is lower than the minimum compression rate stored in minimum compression rate storing unit 3301, image generating unit 3302 compresses the image with the minimum compression rate and stores the compressed image into image storage area 3602 in temporary information storage unit 2208, discarding the part which protrudes image storage area 3602. Image generating unit 3302 stores the discarded part in a blank in image storage area 3602 or in a newly allocated image storage area.

As shown in FIG. 36, character string "TOMORROW, THE WHOLE OF JAPAN WILL ENJOY SPRINGLIKE WEATHER" 2303 is written in the right-hand side of the screen since a blank was made there when image 3601 was stored in image storage area 3602. Note that the character string is written over two lines since it is too long to be represented in a line. Similarly, character string "1 OSAKA . . . 7 SAPPORO" is written over two columns.

Link information 3603 generated by link information generating unit 2207 is the same as link information 3002 in the second embodiment.

Figure 37:
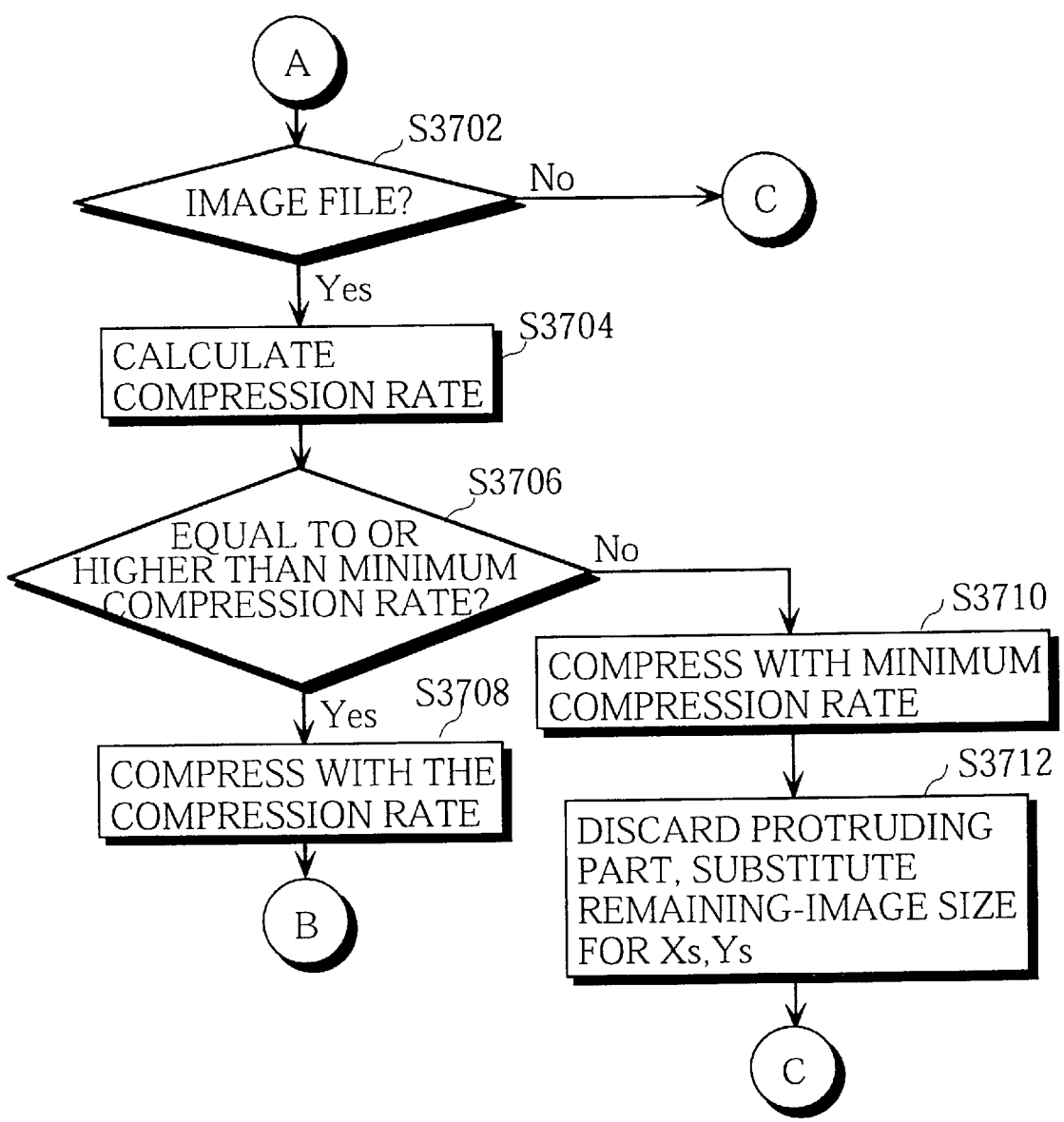
FIG. 37 is a flowchart of the operation in the third embodiment.

The operation unique to the present embodiment is described with reference to the flowchart in FIG. 37.

Figure 32:
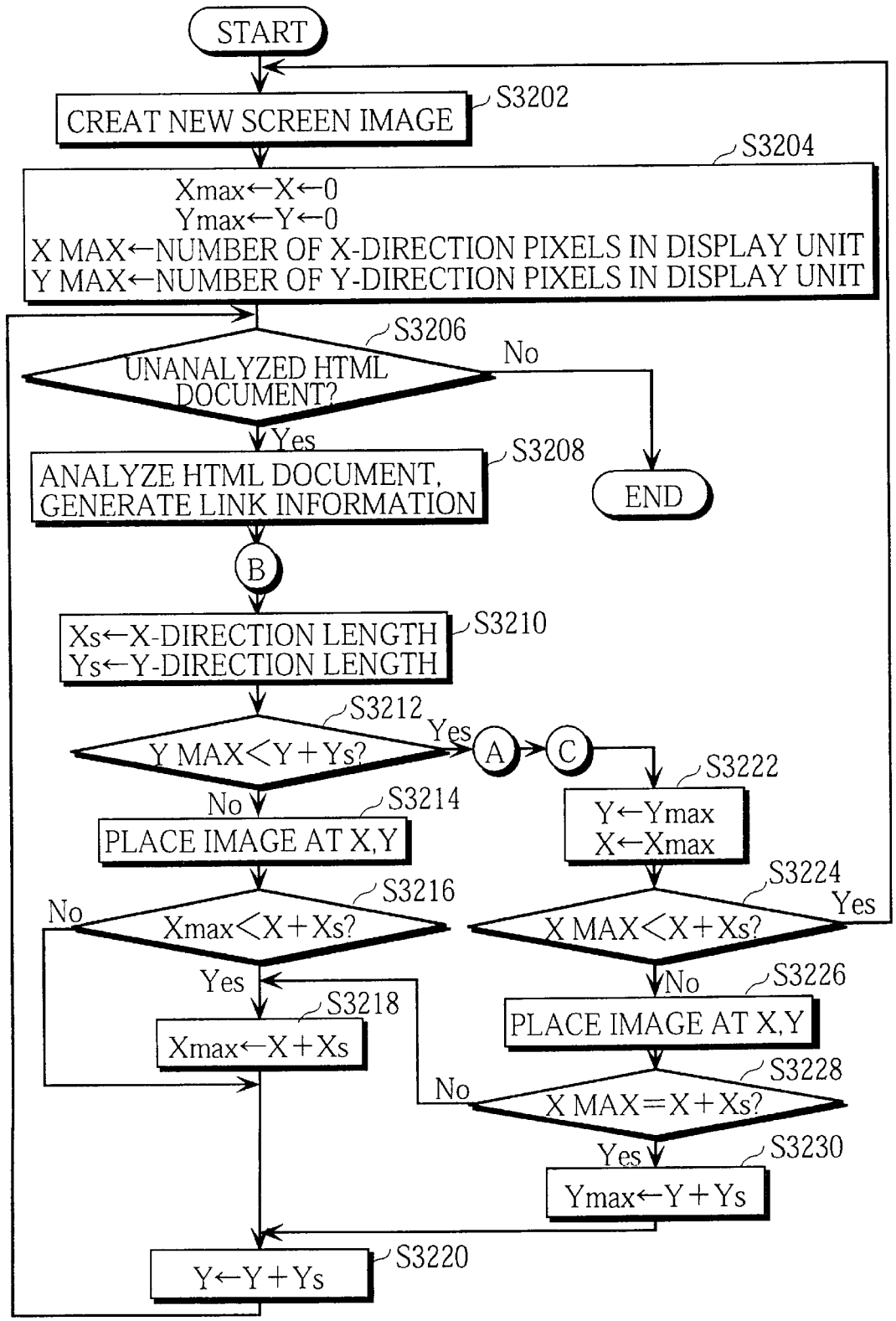
FIG. 32 is a flowchart of the operation in the second embodiment.

If image generating unit 3302 judges that "YMAX<Y+Ys" is satisfied at S3212 in the flowchart of FIG. 32 of the second embodiment, image generating unit 3302 judges whether the object is an image of an image file (S3702). If judged so, image generating unit 3302 calculates compression rate k for the image (S3704). Image generating unit 3302 judges whether the calculated compression rate is equal to or higher than the minimum compression rate stored in minimum compression rate storing unit 3301 (S3706). If judged so, image generating unit 3302 compresses the image with the compression rate (S3708) and returns to S3210.

If judged as not at S3702, that means, the object is a character string, control goes to S3222 of the flowchart of the second embodiment. If judged as not at S3706, that means, the whole of the image cannot be stored with the compression rate, image generating unit 3302 compresses the image with the minimum compression rate (S3710), discards the part which protrudes image storage area 3602, substitutes the horizontal and vertical lengths respectively for Xs and Ys (S3712), and returns to S3210 in the flowchart of the second embodiment.

As understood from the above description, the present embodiment makes it possible for an image with a size exeeding that of the screen of displaying unit 154 to be displayed on the screen by compressing the image.

Fourth Embodiment

FIG. 22 shows the construction of the data conversion apparatus in the fourth embodiment of the present invention which also shows the construction of the second embodiment. That means, the constructions of both embodiments are almost the same. The following is a description of the features unique to the present embodiment.

Temporary document storage unit 2204 stores n pieces of multimedia data which are related to a character string or an image in a document in the multimedia data stored in information obtaining unit 2201. Suppose temporary document storage unit 2204 stores HTML document 2401 as shown in FIG. 24 and HTML document 3801 as shown in FIG. 38.

Figure 39:
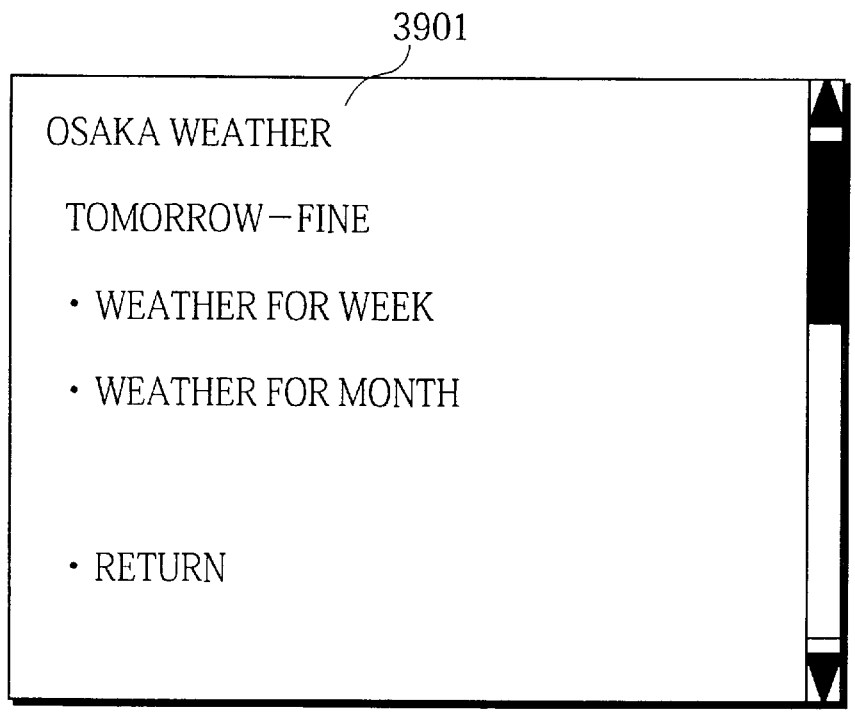
FIG. 39 shows the document of FIG. 24 displayed on the display screen by using a conventional www browser.
Figure 40:
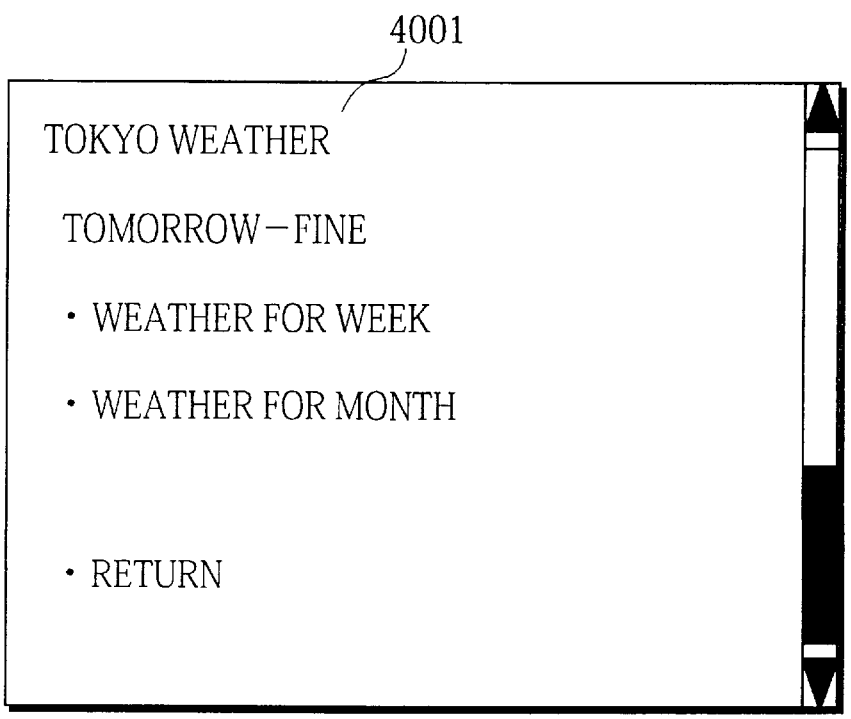
FIG. 40 shows the document of FIG. 38 displayed on the display screen by using a conventional www browser.

Image 3901 in FIG. 39 and image 4001 in FIG. 40 respectively are the images of HTML documents 2401 and HTML document 3801 displayed by a conventional browser on the screen of a PC with aspect ratio "4:3."

Figure 41:
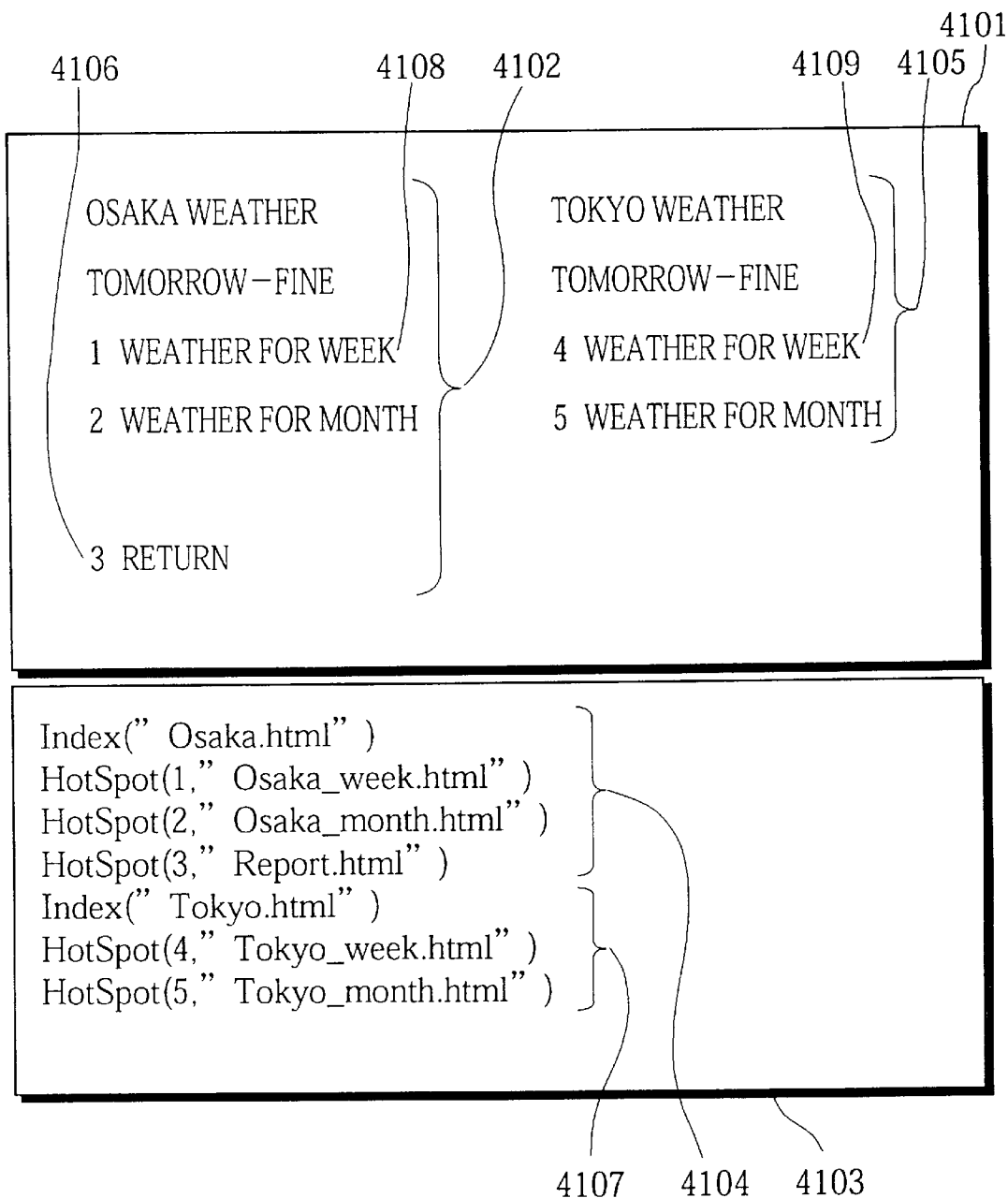
FIG. 41 shows examples of image and link information having been converted and stored in the temporary information storage unit in the fourth embodiment.

Image generating unit 2206, as shown in FIG. 41, stores HTML document 2401, which is written under HTML, in image storage area 4101 of temporary information storage unit 2208 as image 4102.

link information generating unit 2207 writes link information 4104 of HTML document 2401 in link information storage area 4103 of temporary information storage unit 2208.

In the second embodiment, temporary document storage unit 2204 stores only one document. In the present embodiment, temporary document storage unit 2204 also stores HTML document 3801. Accordingly, image generating unit 2206 further analyzes HTML document 3801 and judges whether image storage area 4101 has a blank. If image storage area 4101 has a blank, image generating unit 2206 writes image 4105 of HTML document 3801 into the blank.

If image generating unit 2206 reads a piece of control information which indicates the current character string is the same as that which has been converted already, image generating unit 2206 omits converting of the character string and notifies link information generating unit 2207 of no necessity of generating link information related to the character string. Accordingly, character string "3 RETURN"4106 of image 4102 of HTML document 2401, as shown in FIG. 41, is omitted when HTML document 3801 is analyzed though HTML document 3801 includes tag <A> including the same character string.

As a result of the above operation, image storage area 4101 of temporary information storage unit 2208 stores images 4102 and 4105 of HTML documents 2401 and 3801.

Link information storage area 4103 stores link information 4104 and 4107 of HTML documents 2401 and 3801.

Now, the operation unique to the fourth embodiment is discribed.

At S3208 of the flowchart of the second embodiment, if image generating unit 2206 reads a piece of control information which indicates the current character string is the same as that which has been converted already, image generating unit 2206 omits converting of the character string and notifies link information generating unit 2207 of no necessity of generating link information related to the character string, then goes to S3206.

Note that though "1 WEEK WEATHER" 4108 and "4 WEEK WEATHER" 4109 in FIG. 41 have the same character string, the character string is not omitted since their link destinations are different: "Osaka week.html" and "Tokyo week.html."

As understood from the above embodiments, data generated for a screen with aspect ratio "4:31" can appropreately be displayed on a screen with aspect ratio "16:9."

With such a construction, information provided by www servers on the Internet can easily be dealt with by users of TV receivers even if the users are not accustomed to operations on PCs.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data conversion apparatus for reading a document, which has been written for generating a display image suitable for a first display screen, and generating a display image suitable for a second display screen, wherein the document includes a plurality of control statements, at least a character string, and at least a piece of image information, wherein each of the plurality of control statements is written along with either of the character string and the piece of image information, wherein the first display screen and the second display screen have different aspect ratios, the data conversion apparatus comprising:

document obtaining means for obtaining the document from a unit which is not included in the data conversion apparatus;

screen size storing means for storing a size of the second display screen;

conversion information storing means for storing a plurality pieces of conversion information which respectively correspond to the plurality of control statements;

area storing means for including a plurality of storage areas each of which is suitable for the size of the second display screen;

display image converting means for reading the character string and the piece of image information from the document obtained by the document obtaining means and for converting the character string and the piece of image information respectively into display image elements according to respective pieces of conversion information stored in the conversion information storing means;

space judging means for judging for each of the display image elements whether a space of a first storage area among the plurality of storage areas is enough to store the one of the display image elements based on a corresponding piece of conversion information stored in the conversion information storing means;

display image element writing means for writing the one of the display image elements into the space of the first storage area when the space judging means judges that the space of the first storage area is enough to store the one of the display image elements; and new display image element writing means for, when the space judging means judges that the space of the first storage area is not enough to store the one of the display image elements, writing the one of the display image elements into a second storage area among the plurality of storage areas.

2. The data conversion apparatus of claim 1, wherein each of the plurality pieces of conversion information includes either of a piece of first formation information and a piece of second formation information, wherein the piece of first formation information is included in the piece of conversion information together with a piece of character size information on characters of a corresponding display image element converted from the character string, wherein the display image converting means includes:

a character string converting unit for converting the character string into the display image element according to the piece of first formation information and the piece of character size information, and an image information converting unit for converting the piece of image information into a display image element according to the piece of second formation information.

3. The data conversion apparatus of claim 2, wherein the conversion information storing means further stores starting positions of the display image elements on the second display screen, wherein the starting positions are stored with corresponding control statements, wherein the space judging means includes:

a calculating unit for calculating respective ending positions of the display image elements corresponding to the starting positions;

a Y-coordinate judging unit for judging for each of the display image elements whether a Y coordinate value at an ending position of the one of the display image elements calculated by the calculating unit exceeds a Y coordinate value of the size of the second display screen stored in the screen size storing means; and a first write instructing unit for instructing the display image element writing means to write the one of the display image elements when the Y-coordinate judging unit judges that the Y coordinate value does not exceed the Y coordinate value of the size of the second display screen, wherein the display image element writing means includes:

a first writing unit for, on being instructed by the first write instructing unit to write, writing the one of the display image elements into the first storage area of the area storing means starting from the starting positions.

4. The data conversion apparatus of claim 3, wherein the space judging means further includes:

an X-coordinate judging unit for judging for each of the display image elements whether an X coordinate value at the ending position of the one of the display image elements calculated by the calculating unit exceeds an X coordinate value of the size of the second display screen stored in the screen size storing means when the Y-coordinate judging unit judges that the Y coordinate value exceeds the Y coordinate value of the size of the second display screen;

a second write instructing unit for instructing the display image element writing means to write the one of the display image elements when the X-coordinate judging unit judges that the X coordinate value does not exceed the X coordinate value of the size of the second display screen, wherein the display image element writing means further includes:

a second writing unit for, on being instructed by the second write instructing unit to write, writing the one of the display image elements into a blank in the first storage area, wherein the blank in the first storage area has X coordinate values greater than the X coordinate value of the one of the display image elements written by the first writing unit.

5. The data conversion apparatus of claim 4, wherein the space judging means further includes:

a third write instructing unit for instructing the new display image element writing means to write the one of the display image elements when the X coordinate judging unit judges that the X coordinate value exceeds the X coordinate value of the size of the second display screen, wherein the new display image element writing means instructs the calculating unit to set the starting positions to an initial value and to calculate the ending position of the one of the display image elements on the second display screen, and writes the one of the display image elements into the second storage area.

6. The data conversion apparatus of claim 5, wherein the conversion information storing means further stores a minimum compression rate which is applied to the display image elements converted by the image information converting unit, wherein the display image converting means further includes:

a display image element compressing unit for, when the space judging means judges that space of the first storage area is not enough to store the one of the display image elements, generating a compressed image which has a size smaller than a size of the space of the first storage area, wherein the display image element writing means further includes:

a first compressed image writing unit for prohibiting the new display image element writing means from writing the one of the display image elements into the second storage area and for writing the compressed image into the space of the first storage area when a compression rate of the compressed image is either of equal to and higher than the minimum compression rate;

a second compressed image writing unit for, when the compression rate of the compressed image is lower than the minimum compression rate, generating a minimum compression image by compressing the one of the display image elements with the minimum compression rate, wherein the minimum compression image has a size greater than the size of the space in the area storing means, writing a part of the minimum compression image into the space, and instructing the new display image element writing means to write the rest of the minimum compression image into the second storage area.

7. The data conversion apparatus of claim 6, wherein the space judging means further includes:

a display image element write judging unit for judging whether all display image elements in the document have been written into the area storing means;

a document obtainment judging unit for judging whether the document obtaining means has obtained another document;

a document space judging unit for, when the display image element write judging unit judges that all the display image elements have been written and when the document obtainment judging unit judges that the document obtaining means has obtained the other document, judging whether the first storage area includes a blank for storing display image elements of the other document; and an addition instructing unit for, when the document space judging unit judges that the first storage area includes the blank for storing display image elements of the other document, instructing the display image converting means to read a character string and a piece of image information from the other document obtained by the document obtaining means.

8. The data conversion apparatus of claim 7, wherein the data conversion apparatus is used in a data communication system as a data transmitting apparatus, wherein the data communication system achieves pseudo interactive communications by using one-way communications between the data transmitting apparatus and a plurality of data receiving apparatuses, the data conversion apparatus further comprising:

link information generating means for, when either of the character string and the piece of image information is linked to still another document, generating a piece of link information, wherein the piece of link information indicates that the second display screen should display a display image of the still another document, wherein the piece of link information is related to a display image of the document, wherein one of the plurality of control statements specifies the still another document linked to either of the character string and the piece of image information.

9. The data conversion apparatus of claim 8 further comprising:

identifier assigning means for assigning an identifier to a display image stored in the area storing means and also assigning the identifier to the piece of link information generated by the link information generating means, wherein the data transmitting apparatus sequentially transmits a certain number of display images to each of the plurality of data receiving apparatuses with corresponding pieces of link information.

10. A data conversion apparatus for reading a document, which has been written for generating a display image suitable for a first display screen, and generating a display image suitable for a second display screen, wherein the document includes at least a control statement and at least a character string, wherein the control statement is written along with the character string, wherein the first display screen and the second display screen have different aspect ratios, the data conversion apparatus comprising:

document obtaining means for obtaining the document from a unit which is not included in the data conversion apparatus;

screen size storing means for storing a size of the second display screen;

conversion information storing means for storing at least a piece of conversion information which corresponds to the control statement;

area storing means for including a plurality of storage areas each of which is suitable for the size of the second display screen;

display image converting means for reading the character string from the document obtained by the document obtaining means and for converting the character string into a display image element according to the piece of conversion information stored in the conversion information storing means;

space judging means for judging for the display image element whether a space of a first storage area among the plurality of storage areas is enough to store the display image element based on the corresponding piece of conversion information stored in the conversion information storing means;

display image element writing means for writing the display image element into the space of the first storage area when the space judging means judges that the space of the first storage area is enough to store the display image element; and new display image element writing means for, when the space judging means judges that the space of the first storage area is not enough to store the display image element, writing the display image element into a second storage area among the plurality of storage areas.

11. The data conversion apparatus of claim 10, wherein the piece of conversion information includes a piece of formation information, wherein the piece of formation information is included in the piece of conversion information together with a piece of character size information on characters of a corresponding display image element converted from the character string, wherein the display image converting means includes:

a character string converting unit for converting the character string into the display image element according to the piece of formation information and the piece of character size information.

12. The data conversion apparatus of claim 11, wherein the conversion information storing means further stores a starting position of the display image element on the second display screen, wherein the starting position is stored with the corresponding control statement, wherein the space judging means includes:

a calculating unit for calculating an ending position of the display image element corresponding to the starting position;

a Y-coordinate judging unit for judging for the display image element whether a Y coordinate value at an ending position of the display image element calculated by the calculating unit exceeds a Y coordinate value of the size of the second display screen stored in the screen size storing means; and a first write instructing unit for instructing the display image element writing means to write the display image element when the Y-coordinate judging unit judges that the Y coordinate value does not exceed the Y coordinate value of the size of the second display screen, wherein the display image element writing means includes:

a first writing unit for, on being instructed by the first write instructing unit to write, writing the display image element into the first storage area of the area storing means starting from the starting position.

13. The data conversion apparatus of claim 12, wherein the space judging means further includes:

an X-coordinate judging unit for judging for the display image element whether an X coordinate value at the ending position of the display image element calculated by the calculating unit exceeds an X coordinate value of the size of the second display screen stored in the screen size storing means when the Y-coordinate judging unit judges that the Y coordinate value exceeds the Y coordinate value of the size of the second display screen;

a second write instructing unit for instructing the display image element writing means to write the display image element when the X-coordinate judging unit judges that the X coordinate value does not exceed the X coordinate value of the size of the second display screen, wherein the display image element writing means further includes:

a second writing unit for, on being instructed by the second write instructing unit to write, writing the display image element into a blank in the first storage area, wherein the blank in the first storage area has X coordinate values greater than the X coordinate value of the display image element written by the first writing unit.

14. The data conversion apparatus of claim 13, wherein the space judging means further includes:

a third write instructing unit for instructing the new display image element writing means to write the display image element when the X coordinate judging unit judges that the X coordinate value exceeds the X coordinate value of the size of the second display screen, wherein the new display image element writing means instructs the calculating unit to set the starting positions to an initial value and to calculate the ending position of the display image element on the second display screen, and writes the display image element into the second storage area.

15. The data conversion apparatus of claim 14, wherein the space judging means further includes:

a display image element write judging unit for judging whether all display image elements in the document have been written into the area storing means;

a document obtainment judging unit for judging whether the document obtaining means has obtained another document;

a document space judging unit for, when the display image element write judging unit judges that all the display image elements have been written and when the document obtainment judging unit judges that the document obtaining means has obtained the other document, judging whether the first storage area includes a blank for storing display image elements of the other document; and an addition instructing unit for, when the document space judging unit judges that the first storage area includes the blank for storing display image elements of the other document, instructing the display image converting means to read a character string from the other document obtained by the document obtaining means.

16. The data conversion apparatus of claim 15, wherein the data conversion apparatus is used in a data communication system as a data transmitting apparatus, wherein the data communication system achieves pseudo interactive communications by using one-way communications between the data transmitting apparatus and a plurality of data receiving apparatuses, the data conversion apparatus further comprising:

link information generating means for, when the character string is linked to still another document, generating a piece of link information, wherein the piece of link information indicates that the second display screen should display a display image of the still another document, wherein the piece of link information is related to a display image of the document, wherein one of the plurality of control statements specifies the still another document linked to the character string.

17. The data conversion apparatus of claim 16 further comprising:

identifier assigning means for assigning an identifier to a display image stored in the area storing means and also assigning the identifier to the piece of link information generated by the link information generating means, wherein the data transmitting apparatus cyclically transmits a certain number of display images with corresponding pieces of link information.

* * * * *